US011886731B2

(12) United States Patent
Cui et al.

(10) Patent No.: US 11,886,731 B2
(45) Date of Patent: Jan. 30, 2024

(54) HOT DATA MIGRATION METHOD, APPARATUS, AND SYSTEM

(71) Applicant: Huawei Technologies Co., Ltd., Shenzhen (CN)

(72) Inventors: Baolong Cui, Hangzhou (CN); Chenji Gong, Hangzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/563,553

(22) Filed: Dec. 28, 2021

(65) Prior Publication Data

US 2022/0121384 A1 Apr. 21, 2022

Related U.S. Application Data

(63) Continuation of application No. PCT/CN2020/094801, filed on Jun. 7, 2020.

(30) Foreign Application Priority Data

Jun. 30, 2019 (CN) .......................... 201910583872.8
Sep. 17, 2019 (CN) .......................... 201910878310.6

(51) Int. Cl.
*G06F 3/06* (2006.01)
*G06F 16/2455* (2019.01)
*G06F 11/14* (2006.01)

(52) U.S. Cl.
CPC ............ *G06F 3/0647* (2013.01); *G06F 3/061* (2013.01); *G06F 3/067* (2013.01); *G06F 11/1464* (2013.01); *G06F 16/24552* (2019.01)

(58) Field of Classification Search
CPC .......... G06F 3/0647; G06F 3/061; G06F 3/067
USPC ........................................................ 711/165
See application file for complete search history.

(56) References Cited

U.S. PATENT DOCUMENTS

| 2016/0004571 | A1 | 1/2016 | Smith | |
| 2018/0088870 | A1* | 3/2018 | Lv | .......................... G06F 3/0605 |
| 2019/0026290 | A1* | 1/2019 | Huang | ..................... G06F 16/00 |
| 2019/0303034 | A1* | 10/2019 | Gaertner | ............. G06F 12/0868 |
| 2020/0285391 | A1* | 9/2020 | Sun | ........................ G06F 3/0649 |
| 2020/0401343 | A1* | 12/2020 | Lan | .......................... G06F 3/067 |

FOREIGN PATENT DOCUMENTS

| CN | 102571772 A | 7/2012 |
| CN | 103294785 A | 9/2013 |
| CN | 103440158 A | 12/2013 |
| CN | 108197289 A | 6/2018 |
| CN | 110569233 A | 12/2019 |

* cited by examiner

*Primary Examiner* — Than Nguyen
(74) *Attorney, Agent, or Firm* — Conley Rose, P.C.

(57) ABSTRACT

A first cluster and a second cluster include at least one single-threaded main controller, the at least one single-threaded main controller processes one access request requesting for data at a time, and the data accessed by the access request is jointly managed by the first cluster and the second cluster. A database server determines hot data managed by the first cluster and determines whether a migration condition for migrating the hot data to the second cluster is met. The second cluster manages hot data that meets the migration condition. The database server migrates the hot data that meets the migration condition to the second cluster and triggers an update of an access path of the hot data.

20 Claims, 12 Drawing Sheets

HOT DATA MIGRATION METHOD, APPARATUS, AND SYSTEM

CROSS-REFERENCE TO RELATED APPLICATIONS

This application is a continuation application of International Patent Application No. PCT/CN2020/094801 filed on Jun. 7, 2020, which claims priority to Chinese Patent Application No. 201910878310.6 filed on Sep. 17, 2019 and Chinese Patent Application No. 201910583872.8 filed on Jun. 30, 2019. All of the aforementioned patent applications are hereby incorporated by reference in their entireties.

TECHNICAL FIELD

The present disclosure relates to the field of information technologies, and in particular, to a hot data management method, an apparatus, and a system.

BACKGROUND

To ensure that a database can provide a service stably and efficiently, a cache mechanism is generally set between a database (DB) and a client. Using the cache mechanism can not only relieve pressure on a database server, but also improve a data read/write speed. An in-memory database is usually used as a cache layer between the client and the database. All data access control of the in-memory database is performed in a memory. Because a read/write speed of the memory is fast, performance of the in-memory database is good.

Redis is an in-memory database that can be used as the cache layer between the client and the database. The Redis is a key-value lockless database that is written in C language and compliant with the Berkeley Software Distribution (BSD) protocol, that supports networks, and that is memory-based or persistent. A. Redis cluster is a distributed Redis solution, effectively meets requirements of distributed Redis, and can achieve load balancing by using a cluster architecture.

In an actual application scenario, the Redis cluster may receive a large quantity of frequent access requests for single data, and clients send a large quantity of requests for data corresponding to a same key (which may correspond to a promotional product, hot news, a hot topic, or the like of an application). According to a hash value of the key, all access requests are centralized on a same physical device. This greatly increases load of the physical device. Consequently, a main control unit deployed on the physical device and the physical device may break down. This phenomenon is referred to as a "hot key" problem.

In the hot key phenomenon, a large amount of traffic is concentrated and reaches an upper limit of a server. In addition, the requests are concentrated on one server, causing the server to break down. Consequently, the entire cache mechanism is broken down by the hot key. In this case, the service requests directly access a backend database and further break down the DB. This causes a series of service breakdowns.

SUMMARY

Embodiments of the present disclosure disclose a hot data management method, an apparatus, and a system. When hot data appears in a first cluster, the hot data can be migrated to a second cluster, so that service pressure of the first cluster is reduced and performance and reliability of the first cluster are ensured.

According to a first aspect, this application provides a hot data management method, performed by a monitoring process in a database server, and includes a monitoring module in the monitoring process determines hot data managed by a first cluster. The first cluster includes at least one single-threaded main control unit, the single-threaded main control unit processes one access request at a time, and the access request includes an access request for data. The monitoring module determines whether a migration condition for migrating the hot data to a second cluster is met. The second cluster includes at least one single-threaded main control unit, the data accessed by the access request is jointly managed by the first cluster and the second cluster, and the second cluster is used to manage hot data that meets the migration condition. When the migration condition is met, a migration module in the monitoring process migrates the hot data to the second cluster, and triggers update of an access path of the hot data.

In this embodiment of this application, the first cluster may be a Redis cluster, the main control unit of the first cluster may be deployed on a plurality of physical devices, the second cluster is a secondary cluster of the first cluster, and the main control unit of the second cluster and the main control unit of the first cluster may be deployed on a same physical device. When the hot data exists in the first cluster, the hot data is migrated to the second cluster, so that service pressure of the first cluster can be reduced, load balancing between the first cluster and the second cluster can be implemented, and high performance and reliability of the first cluster can be ensured. With reference to the first aspect, in a possible implementation of the first aspect, a first main control unit in the first cluster and a first main control unit in the second cluster are deployed on different physical devices.

With reference to the first aspect, in a possible implementation of the first aspect, the main control unit manages at least one hash slot. An identifier of the hash slot is an integer obtained by mapping data by using a preset algorithm, and the hash slot includes at least one piece of data. A hash slot managed by the first main control unit in the first cluster and a hash slot managed by the first main control unit in the second cluster have a same identifier.

Optionally, the preset algorithm includes a hash algorithm.

In this embodiment of this application, the main control units that are in the two clusters and that manage hash slots with the same identifier are deployed on different physical devices, so that service pressure of a single physical device can be distributed. This ensures that the cluster can properly provide an external service.

With reference to the first aspect, in a possible implementation of the first aspect, the monitoring module counts a quantity of access times of data managed by the first cluster within a preset period, and determines data whose quantity of access times exceeds a first threshold as the hot data.

With reference to the first aspect, in a possible implementation of the first aspect, the migration module reads the hot data and a key corresponding to the hot data from the first cluster, determines a first hash slot in the second cluster based on the key corresponding to the hot data, and migrates the hot data and the key corresponding to the hot data to the first hash slot.

In the solution provided in this application, the migration module reads the hot data and the key corresponding to the hot data from the first cluster, and then writes the hot data and the key corresponding to the hot data into the first hash slot after determining the first hash slot in the second cluster, to complete migration of the hot data.

With reference to the first aspect, in a possible implementation of the first aspect, the migration module sends migration information to a client communicating with the first cluster and the second cluster. The migration information carries the key corresponding to the hot data, the migration information is used to indicate the client to record the key corresponding to the hot data in a key set, the key set is used by the client to determine a target cluster corresponding to the access request, and the target cluster includes the first duster and the second cluster.

In the solution provided in this application, the client receives the migration information that is sent by the migration module and that carries the key corresponding to the hot data, and records the key corresponding to the hot data in the key set. In this way, when there is an access request for the hot data, the client can accurately find, based on the key set, the target cluster that manages the hot data.

With reference to the first aspect, in a possible implementation of the first aspect, before the migration module sends the migration information to the client communicating with the first cluster and the second cluster, the migration module reads hot data managed by the first cluster after the migration, and verifies whether the hot data is consistent with the hot data managed by the first cluster before the migration. When the hot data managed by the first cluster after the migration is consistent with the hot data managed by the first cluster before the migration, the migration module sends the migration information to the client communicating with the first cluster and the second cluster.

In the solution provided in this application, after completing migration of the hot data, the migration module determines data consistency, to be specific, determines whether the hot data managed by the first cluster before and after the migration is consistent, so as to determine whether the hot data changes in a migration process. When data is consistent, the migration module sends the migration information that includes the key corresponding to the hot data to the client, so that the client can accurately access the hot data.

With reference to the first aspect, in a possible implementation of the first aspect, the migration module sends the migration information to the client communicating with the first cluster and the second cluster. The migration information carries the hot data and the key corresponding to the hot data, the migration information is used to indicate the client to record the hot data and the key corresponding to the hot data in a first set, and the first set is used by the client to determine data consistency.

In the solution provided in this application, the client maintains the first set, and the first set records the hot data and the key corresponding to the hot data. The client may determine, based on the first set, whether the hot data changes in the migration process, so as to ensure data consistency.

With reference to the first aspect, in a possible implementation of the first aspect, the monitoring module calculates resource usage of each main control unit in the first cluster, monitors a main control unit whose resource usage exceeds a first threshold, counts a quantity of access times of each piece of data managed by the main control unit whose resource usage exceeds the first threshold within a preset period, and determines data whose quantity of access times exceeds a second threshold as the hot data.

In the solution provided in this application, the monitoring module calculates the resource usage of each main control unit, monitors the main control unit whose resource usage exceeds the first threshold, and further collects statistics on each data access managed by the main control unit whose resource usage exceeds the first threshold, to determine the hot data. This can avoid monitoring all main control units to affect performance of the first cluster, and improve monitoring efficiency.

With reference to the first aspect, in a possible implementation of the first aspect, the monitoring module counts a total quantity of access times of data managed by the main control unit whose resource usage exceeds the first threshold, and when the total quantity of access times exceeds a third threshold, determines that hot data managed by the main control unit whose resource usage exceeds the first threshold meets the migration condition.

In the solution provided in this application, after determining the hot data, the monitoring module needs to further determine whether the migration condition for migrating the hot data is met. In other words, the monitoring module counts a total quantity of access times of all data managed by the main control unit that manages the hot data, and when the total quantity of access times exceeds a preset threshold, determines that the migration condition is met. This can avoid frequent migration of the hot data, and ensure performance of the first cluster.

With reference to the first aspect, in a possible implementation of the first aspect, the monitoring module monitors the second cluster, where the second cluster manages the hot data migrated from the first cluster to the second cluster, counts a quantity of access times of the hot data within a preset period, and when the quantity of access times of the hot data is less than a fourth threshold, marks the hot data as non-hot data. The migration module migrates the non-hot data to the first cluster, and triggers update of an access path of the non-hot data.

In the solution provided in this application, the monitoring module monitors the second cluster, counts the quantity of access times of the data managed by the second cluster to determine the non-hot data, and after determining the non-hot data, migrates the non-hot data to the first cluster by using the migration module. In this way, load balancing can be implemented between the first cluster and the second cluster, to avoid a breakdown caused by excessive service pressure of the second cluster due to continuous migration of the hot data to the second cluster.

With reference to the first aspect, in a possible implementation of the first aspect, the first cluster or the second cluster includes at least one main control unit. The at least one main control unit manages a same quantity of hash slots, or manages different quantities of hash slots according to a preset rule. A total quantity of hash slots is 16384.

With reference to the first aspect, in a possible implementation of the first aspect, the resource usage includes a central processing unit (CPU) resource usage, memory resource usage, or network capability resource usage.

With reference to the first aspect, in a possible implementation of the first aspect, the main control unit includes at least one standby control unit, and the standby control unit is configured to replace the main control unit as a new main control unit when the main control unit is faulty.

With reference to the first aspect, in a possible implementation of the first aspect, each main control unit corresponds to a unique IP address and a port number, and the monitoring process manages each main control unit based on the IP address and the port number.

With reference to the first aspect, in a possible implementation of the first aspect, before migrating the hot data to the second cluster, the monitoring module performs priority classification on the hot data, and preferably migrates hot data with a highest priority to the second cluster.

With reference to the first aspect, in a possible implementation of the first aspect, the monitoring process communicates with the client through a Transmission Control Protocol (TCP) connection or a dedicated path connection, and the migration module sends the migration information to the client through the TCP connection or the dedicated path connection.

With reference to the first aspect, in a possible implementation of the first aspect, a reply acknowledgment mechanism is used between the monitoring process and the client, to ensure that all clients communicating with the migration module successfully receive the migration information.

According to a second aspect, this application provides a hot data access method, including a client queries, based on a key in a service request, whether a key set includes the key. The key set includes a key corresponding to hot data migrated from a first cluster to a second cluster, the first cluster and the second cluster include at least one single-threaded main control unit, the single-threaded main control unit processes one access request at a time, the access request includes an access request for data, and the data accessed by the access request is jointly managed by the first cluster and the second cluster. The client determines a target cluster based on a query result. The target cluster includes the first cluster or the second cluster. The client sends an access request to the target cluster. The access request includes the key in the service request.

In the solution provided in this application, the client maintains the key set, and the key set includes the key corresponding to all hot data migrated from the first cluster to the second cluster. When generating the service request, the client determines whether the key in the service request exists in the key set, so as to select a correct cluster for access.

With reference to the second aspect, in a possible implementation of the second aspect, the client receives migration information sent by a database server, where the migration information includes the key corresponding to the hot data, and records the key corresponding to the hot data in the key set.

With reference to the second aspect, in a possible implementation of the second aspect, the client receives first migration information sent by a database server, where the first migration information includes the hot data and the key corresponding to the hot data, records the hot data and the key corresponding to the hot data in a first set, receives second migration information sent by the database server, where the second migration information includes non-hot data and a key corresponding to the non-hot data, and records the non-hot data and the key corresponding to the non-hot data in a second set. The first set and the second set are separately used to buffer data on which data consistency determining is not performed.

In the solution provided in this application, the client maintains the first set and the second set. The first set records the hot data and the key corresponding to the hot data. The client may determine, based on the first set, whether the hot data changes in a migration process, so as to ensure data consistency. The second set records the non-hot data and the key corresponding to the non-hot data. The client may determine, based on the second set, whether the non-hot data changes in the migration process, so as to ensure data consistency.

With reference to the second aspect, in a possible implementation of the second aspect, if the key set and the second set include the key in the service request, and when data that corresponds to the key and that is in the second set is consistent with data that corresponds to the key and that is managed by the second cluster, it is determined that the first duster is the target cluster, or when data that corresponds to the key and that is in the second set is inconsistent with data that corresponds to the key and that is managed by the second cluster, it is determined that the second cluster is the target cluster. If the key set does not include the key in the service request, and the first set includes the key in the service request, and when data that corresponds to the key and that is in the first set is consistent with data that corresponds to the key and that is managed by the first cluster, it is determined that the second cluster is the target cluster, or when data that corresponds to the key and that is in the first set is inconsistent with data that corresponds to the key and that is managed by the first cluster, it is determined that the first cluster is the target cluster.

According to a third aspect, this application provides a network device, including a processing module configured to determine hot data managed by a first cluster, where the first cluster includes at least one single-threaded main control unit, the single-threaded main control unit processes one access request at a time, and the access request includes an access request for data, a determining module configured to determine whether a migration condition for migrating the hot data to a second cluster is met, where the second cluster includes at least one single-threaded main control unit, the data accessed by the access request is jointly managed by the first cluster and the second cluster, and the second cluster is used to manage hot data that meets the migration condition, and a migration module configured to, when the migration condition is met, migrate the hot data to the second cluster, and trigger update of an access path of the hot data.

With reference to the third aspect, in a possible implementation of the third aspect, a first main control unit in the first cluster and a first main control unit in the second cluster are deployed on different physical devices.

With reference to the third aspect, in a possible implementation of the third aspect, the main control unit manages at least one hash slot. An identifier of the hash slot is an integer obtained by mapping data by using a preset algorithm, and the hash slot includes at least one piece of data. A hash slot managed by the first main control unit in the first cluster and a hash slot managed by the first main control unit in the second cluster have a same identifier.

With reference to the third aspect, in a possible implementation of the third aspect, the processing module is further configured to read the hot data and a key corresponding to the hot data from the first cluster, and determine a first hash slot in the second cluster based on the key corresponding to the hot data. The migration module is further configured to migrate the hot data and the key corresponding to the hot data to the first hash slot.

With reference to the third aspect, in a possible implementation of the third aspect, the network device further includes a sending module. The sending module is configured to send migration information to a client communicating with the first cluster and the second cluster. The migration information includes the key corresponding to the hot data, the migration information is used to indicate the client to record the key corresponding to the hot data in a key set, the key set is used by the client to determine a target cluster corresponding to the access request, and the target cluster includes the first cluster and the second cluster.

With reference to the third aspect, in a possible implementation of the third aspect, the processing module is further configured to read hot data managed by the first cluster after the migration, and verify whether the hot data is consistent with the hot data managed by the first cluster before the migration. The sending module is further configured to when the hot data managed by the first cluster after the migration is consistent with the hot data managed by the first cluster before the migration, send the migration information to the client communicating with the first cluster and the second cluster.

With reference to the third aspect, in a possible implementation of the third aspect, the network device further includes a sending module. The sending module is configured to send the migration information to the client communicating with the first cluster and the second cluster. The migration information carries the hot data and the key corresponding to the hot data, the migration information is used to indicate the client to record the hot data and the key corresponding to the hot data in a first set, and the first set is used by the client to determine data consistency.

With reference to the third aspect, in a possible implementation of the third aspect, the processing module is further configured to calculate resource usage of each main control unit in the first cluster, monitor a main control unit whose resource usage exceeds a first threshold, count a quantity of access times of each piece of data managed by the main control unit whose resource usage exceeds the first threshold within a preset period, and determine data whose quantity of access times exceeds a second threshold as the hot data.

With reference to the third aspect, in a possible implementation of the third aspect, the determining module is further configured to count a total quantity of access times of data managed by the main control unit whose resource usage exceeds the first threshold, and when the total quantity of access times exceeds a third threshold, determine that hot data managed by the main control unit whose resource usage exceeds the first threshold meets the migration condition.

With reference to the third aspect, in a possible implementation of the third aspect, the processing module is further configured to monitor the second cluster, where the second cluster manages the hot data migrated from the first cluster to the second cluster, count a quantity of access times of the hot data within a preset period, and when the quantity of access times of the hot data is less than a fourth threshold, mark the hot data as non-hot data. The migration module is further configured to migrate the non-hot data to the first cluster, and trigger update of an access path of the non-hot data.

According to a fourth aspect, this application provides a client device, including a processing module configured to query, based on a key in a service request, whether a key set includes the key, where the key set includes a key corresponding to hot data migrated from a first cluster to a second cluster, the first cluster and the second cluster include at least one single-threaded main control unit, the single-threaded main control unit processes one access request at a time, the access request includes an access request for data, and the data accessed by the access request is jointly managed by the first cluster and the second cluster, and determine a target cluster based on a query result, where the target cluster includes the first cluster or the second cluster, and a sending module configured to send an access request to the target cluster, where the access request includes the key in the service request.

With reference to the fourth aspect, in a possible implementation of the fourth aspect, the client device further includes a receiving module. The receiving module is configured to receive migration information sent by a database server. The migration information includes the key corresponding to the hot data. The processing module is further configured to record the key corresponding to the hot data in the key set.

With reference to the fourth aspect, in a possible implementation of the fourth aspect, the client device further includes a receiving module. The receiving module is configured to receive first migration information sent by a database server. The first migration information includes the hot data and the key corresponding to the hot data. The processing module is further configured to record the hot data and the key corresponding to the hot data in a first set. The receiving module is further configured to receive second migration information sent by the database server. The second migration information includes non-hot data and a key corresponding to the non-hot data. The processing module is further configured to record the non-hot data and the key corresponding to the non-hot data in a second set. The first set and the second set are separately used to buffer data on which data consistency determining is not performed.

With reference to the fourth aspect, in a possible implementation of the fourth aspect, the processing module is further configured to, when the key set and the second set include the key in the service request, and when data that corresponds to the key and that is in the second set is consistent with data that corresponds to the key and that is managed by the second cluster, determine that the first cluster is the target cluster, or when data that corresponds to the key and that is in the second set is inconsistent with data that corresponds to the key and that is managed by the second cluster, determine that the second cluster is the target cluster. The processing module is further configured to when the key set does not include the key in the service request, and the first set includes the key in the service request, and when data that corresponds to the key and that is in the first set is consistent with data that corresponds to the key and that is managed by the first cluster, determine that the second cluster is the target cluster, or when data that corresponds to the key and that is in the first set is inconsistent with data that corresponds to the key and that is managed by the first cluster, determine that the first cluster is the target cluster.

According to a fifth aspect, this application provides a network device. The network device includes a processor and a memory, the memory is configured to store program code, and the processor is configured to invoke the program code in the memory to perform the method according to any one of the first aspect or the implementations with reference to the first aspect.

According to a sixth aspect, this application provides a client device. The client device includes a processor and a memory, the memory is configured to store program code, and the processor is configured to invoke the program code in the memory to perform the method according to any one of the second aspect or the implementations with reference to the second aspect.

According to a seventh aspect, this application provides a computer storage medium. The computer storage medium stores a computer program. When the computer program is executed by a processor, a procedure of the method according to any one of the first aspect or the implementations with reference to the first aspect may be implemented.

According to an eighth aspect, this application provides a computer storage medium. The computer storage medium stores a computer program. When the computer program is executed by a processor, a procedure of the method according to any one of the second aspect or the implementations with reference to the second aspect may be implemented.

According to a ninth aspect, this application provides a computer program. The computer program includes instructions. When the computer program is executed by a computer, the computer is enabled to perform a procedure of the method according to any one of the first aspect or the implementations with reference to the first aspect.

According to a tenth aspect, this application provides a computer program. The computer program includes instructions. When the computer program is executed by a computer, the computer is enabled to perform a procedure of the method according to any one of the second aspect or the implementations with reference to the second aspect.

According to an eleventh aspect, this application provides a hot data migration system, including a network device and a client device. The network device and the client device may communicate with each other.

The network device is configured to perform the method according to any one of the first aspect.

The client device is configured to perform the method according to any one of the second aspect.

BRIEF DESCRIPTION OF DRAWINGS

To describe some of the technical solutions in embodiments of the present disclosure more clearly, the following briefly describes the accompanying drawings for describing some of the embodiments. It is clearly that the accompanying drawings in the following descriptions show a part of the embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of this application with reference to the accompanying drawings. It is clearly that the described embodiments are merely a part rather than all of the embodiments of this application.

Some terms and related technologies in this application are first described with reference to the accompanying drawings, to help a person skilled in the art have a better understanding.

A Redis cluster is a distributed Redis solution. The Redis cluster uses virtual slot partitioning, and maps all data to hash slots with different identifiers by using a hash algorithm with good dispersion. Each slot includes one or more pieces of data, an identifier of each slot is an integer, a value of the integer ranges from 0 to 16383, and different slots correspond to different identifiers. The Redis cluster contains a total of 16384 slots. The slot is a basic unit for data management and migration in the cluster. Each node (which may be called a main control unit or a process) in the cluster manages a specific quantity of slots. Data is stored in the Redis cluster in a form of a key-value pair. When a piece of data needs to be stored in the Redis cluster, a hash operation is first performed on a key corresponding to the data to obtain a data result, and then the data result is used to take a remainder of 16384. The remainder is an identifier of a slot. A unique slot may be determined based on the identifier, and a specific value of the data and a main control unit that manages a key corresponding to the data may be determined. Once a main control unit is faulty, a slot managed by the main control unit cannot be accessed. As a result, the entire Redis cluster cannot operate properly. When the Redis cluster is deployed, all main control units are deployed on different physical devices in a distributed manner to implement load balancing.

Application programming interfaces (APIs) are some predefined functions, and intend to provide a capability for an application to access a group of routines based on software or hardware, without accessing source code or understanding details of an internal working mechanism. The routines are a set of external functional interfaces provided by a system, and are similar to functions. For example, a service, a standard function, and a library function are routines. External API invocation enhances content correlation between devices. To provide a unified API, an open and unified API environment needs to be provided for a device that invokes an API, to help a user access functions and resources of the device. For example, in the embodiments of this application, a client may perform scheduling through an API provided by a server, to access data of the server, and the client does not need to understand a complex scheduling mechanism and a hot data migration mechanism of the client.

Figure 1:
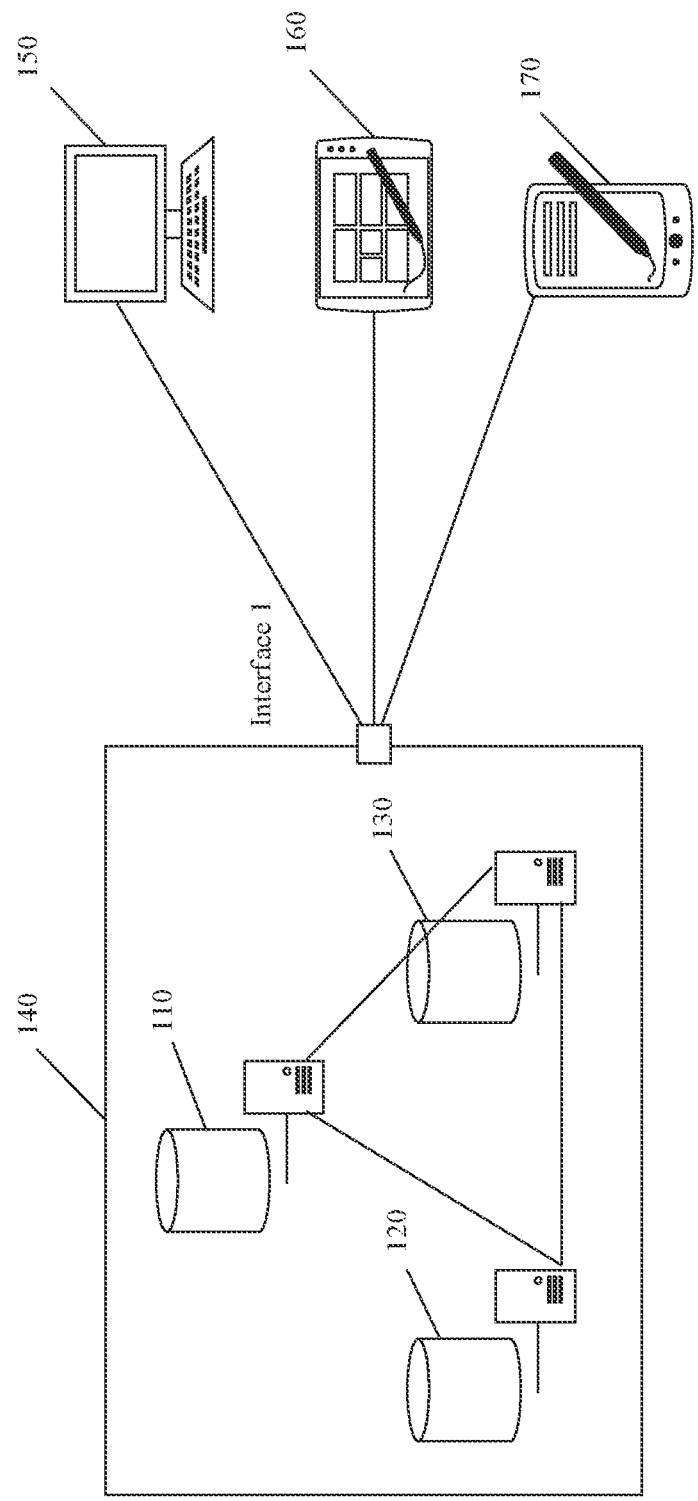
FIG. 1 is a schematic diagram of an application scenario according to an embodiment of this application.

FIG. 1 is a possible application scenario according to an embodiment of this application. In this application scenario, a device 110, a device 120, and a device 130 are network node devices, for example, database servers, and may deploy main control units belonging to a same cluster, for example, deploy main control units belonging to a cluster 140. A device 150, a device 160, and a device 170 are user equipment, for example, mobile phones, tablet computers, personal computers, or servers, An interface 1 is an external logical interface provided by the cluster 140, and the interface 1 may be an API. The device 150, the device 160, and the device 170 may access data of the cluster 140 through the interface 1, in other words, the device 150, the device 160, and the device 170 may access any one of the device 110, the device 120, and the device 130 through the interface 1. The device 110, the device 120, and the device 130 each include one or more main control units, each main control unit may be configured with one or more standby control units. All main control units in the device 110, the device 120, and the device 130 serve externally as a whole (that is, in a form of the cluster 140). The cluster can properly provide a service only when integrity of the cluster is ensured, and a quantity of slots managed by the cluster need to be 16384. In other words, if a main control unit is faulty, a slot managed by the main control unit cannot be accessed, and a cluster to which the main control unit belongs cannot operate properly, that is, the entire cluster breaks down. When a main control unit is faulty, a standby control unit may be selected from the standby control units configured in the main control unit to take over functions of the original main control unit and serve as a new main control unit. Any one of the device 150, the device 160, and the device 170 includes a client process. The client process includes a client interface. The client process invokes the interface 1 through the client interface, and may access data managed by any main control unit of the device 110, the device 120, or the device 130.

When a main control unit in a network node device receives a large quantity of access requests for single data, a hot key phenomenon may occur. For example, if a main control unit in the device 110 receives a large quantity of access requests for single data, load of the main control unit increases, and this may cause a problem that the main control unit cannot operate properly. If the main control unit is faulty, after a standby control unit takes over the main control unit and serves as a new main control unit, the large quantity of access requests for single data still exist, that is, the standby control unit still needs to process these access requests. As a result, load of the standby control unit increases, and the standby control unit breaks down. After the standby control unit also fails to operate properly, integrity of the cluster 140 is damaged, that is, a slot managed by the cluster 140 is missing and the quantity of slots is no longer 16384. Consequently, the cluster 140 cannot provide a service.

To resolve the foregoing problem, this application provides a hot data migration method, an apparatus, and a system. When hot data exists in a primary cluster, the hot data is migrated to a secondary cluster, so that service pressure of the primary cluster is reduced and performance and reliability of the primary cluster are ensured.

Figure 2A:
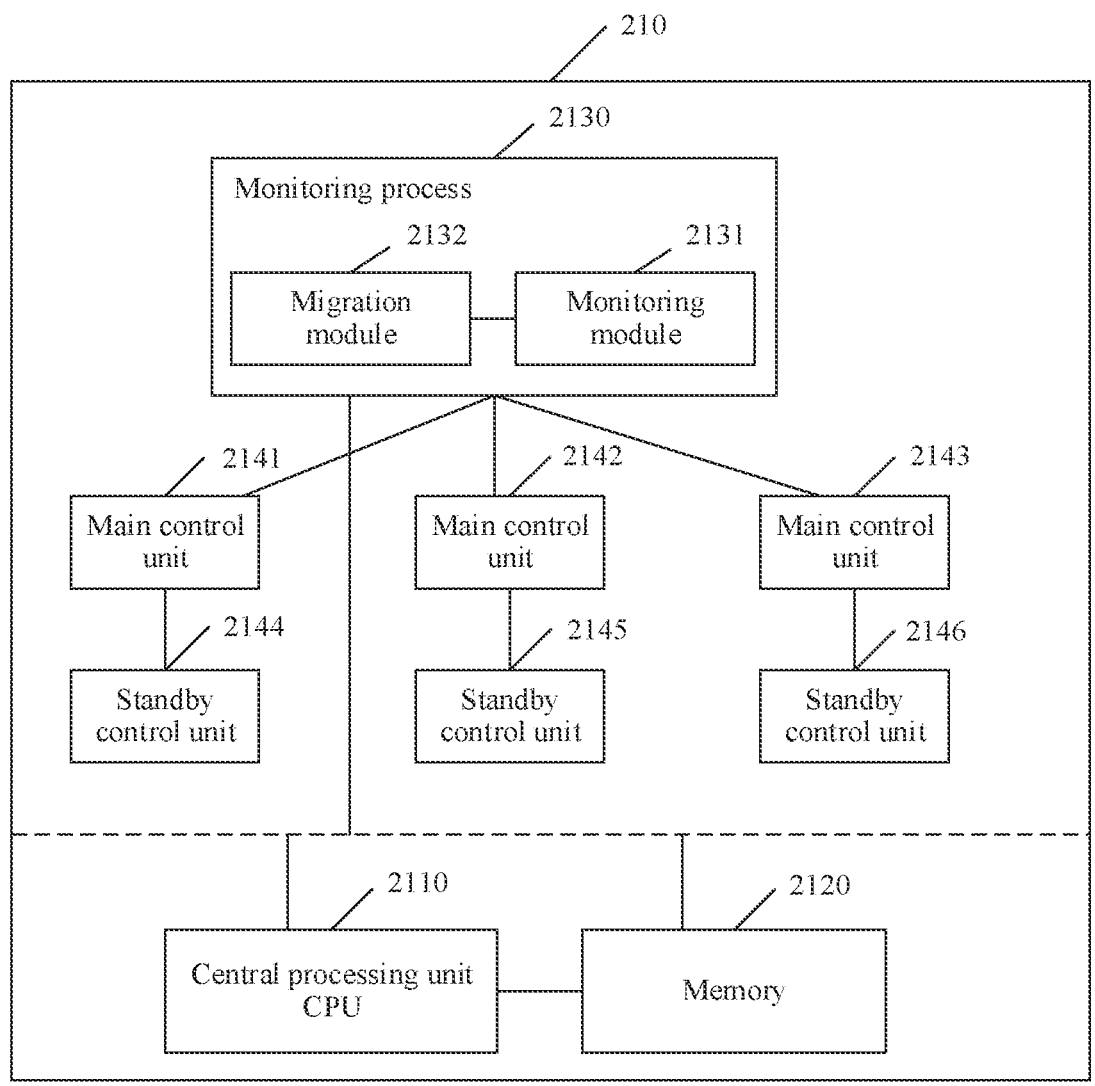
FIG. 2A is a schematic diagram of an internal structure of a network node device according to an embodiment of this application.

FIG. 2A is a schematic diagram of an internal structure of a network node device 210. It should be understood that FIG. 2A shows only some hardware structures and some software modules in the device 210. During specific implementation, the device 210 may further include more hardware structures such as a communications interface, and more software modules such as various applications. As shown in FIG. 2A, the device 210 includes a CPU 2110, a memory 2120 and a monitoring process 2130. The CPU 2110 invokes and executes a program stored in the memory 2120 to generate a main control unit 2141, a main control unit 2142, a main control unit 2143, a standby control unit 2144 of the main control unit 2141, a standby control unit 2145 of the main control unit 2142, and a standby control unit 2146 of the main control unit 2143. Herein, only three main control units are shown as examples, and more main control units can be further generated. In addition, a plurality of standby control units may be further configured for each main control unit, and FIG. 2A shows only one standby control unit as an example. It should be noted that, in FIG. 2A, below the dashed line are the hardware structures CPU 2110 and memory 2120 in the device 210, and above the dashed line are the monitoring process 2130 that runs by using hardware, the main control unit 2141, the main control unit 2142, the main control unit 2143, the standby control unit 2144 of the main control unit 2141, the standby control unit 2145 of the main control unit 2142, and the standby control unit 2146 of the main control unit 2143 that are in the device 210. For example, the CPU 2110 invokes a program in the memory 2120 to implement a monitoring management function of the monitoring process 2130. In FIG. 2A, the memory 2120 stores data managed by the main control unit 2141, the main control unit 2142, and the main control unit 2143. Each main control unit or standby control unit is a process in the device 210. Each main control unit is also referred to as a Redis instance, and is responsible for managing a specific quantity of slots. Each main control unit is single-threaded, in other words, a same main control unit can process only one access request at a time, that is, only one access request can be processed at any given moment, and a plurality of access requests cannot be processed, to ensure a high performance requirement. It should be noted that each main control unit occupies a specific storage resource when running, and the storage resource stores data or a data set. It should be further understood that the main control unit 2141, the main control unit 2142, and the main control unit 2143 may be main control units belonging to a same cluster, or may be main control units belonging to different clusters. It should be noted that each main control unit corresponds to a unique identifier, and the identifier includes an Internet Protocol (IP) and a port number. The device 210 may identify each main control unit by using the identifier. In addition, the device 210 may further select some main control units as main control units of the primary cluster by using the identifier, and select some main control units as main control units of the secondary cluster by using the identifier. For example, the main control unit 2141 and the main control unit 2142 are selected as the main control units in the primary cluster, and the main control unit 2143 is selected as the main control unit in the secondary cluster. The main control unit in the primary cluster and the main control unit in the secondary cluster share a memory resource of the device 210. Data (such as hot data) managed by the primary cluster may be migrated to the secondary cluster, and the secondary cluster performs management, so as to distribute service pressure of the primary cluster. Data (such as non-hot data) managed by the secondary cluster may also be migrated back to the primary cluster, and the primary cluster performs management, so as to prevent the secondary cluster from breaking down due to heavy service pressure. It should be noted that in subsequent descriptions of this application, an example in which the main control unit of the secondary cluster is deployed on a physical device on which the main control unit of the primary cluster is deployed is used for description. Certainly, the main control unit of the primary cluster and the main control unit of the secondary cluster may alternatively be separately deployed on different physical devices. This is not limited in this application. The monitoring process 2130 is connected to, and monitors and manages the main control unit 2141, the main control unit 2142, and the main control unit 2143. The monitoring process 2130 includes a monitoring module 2131 and a migration module 2132, The monitoring module 2131 is responsible for monitoring the main control unit 2141, the main control unit 2142, and the main control unit 2143, and identifying hot data in the main control unit 2141, the main control unit 2142, and the main control unit 2143. After identifying the hot data, the monitoring module 2131 notifies the migration module 2132. The migration module 2132 migrates the hot data identified by the monitoring module 2131, and sends migration information to user equipment connected to the device 210.

Figure 2B:
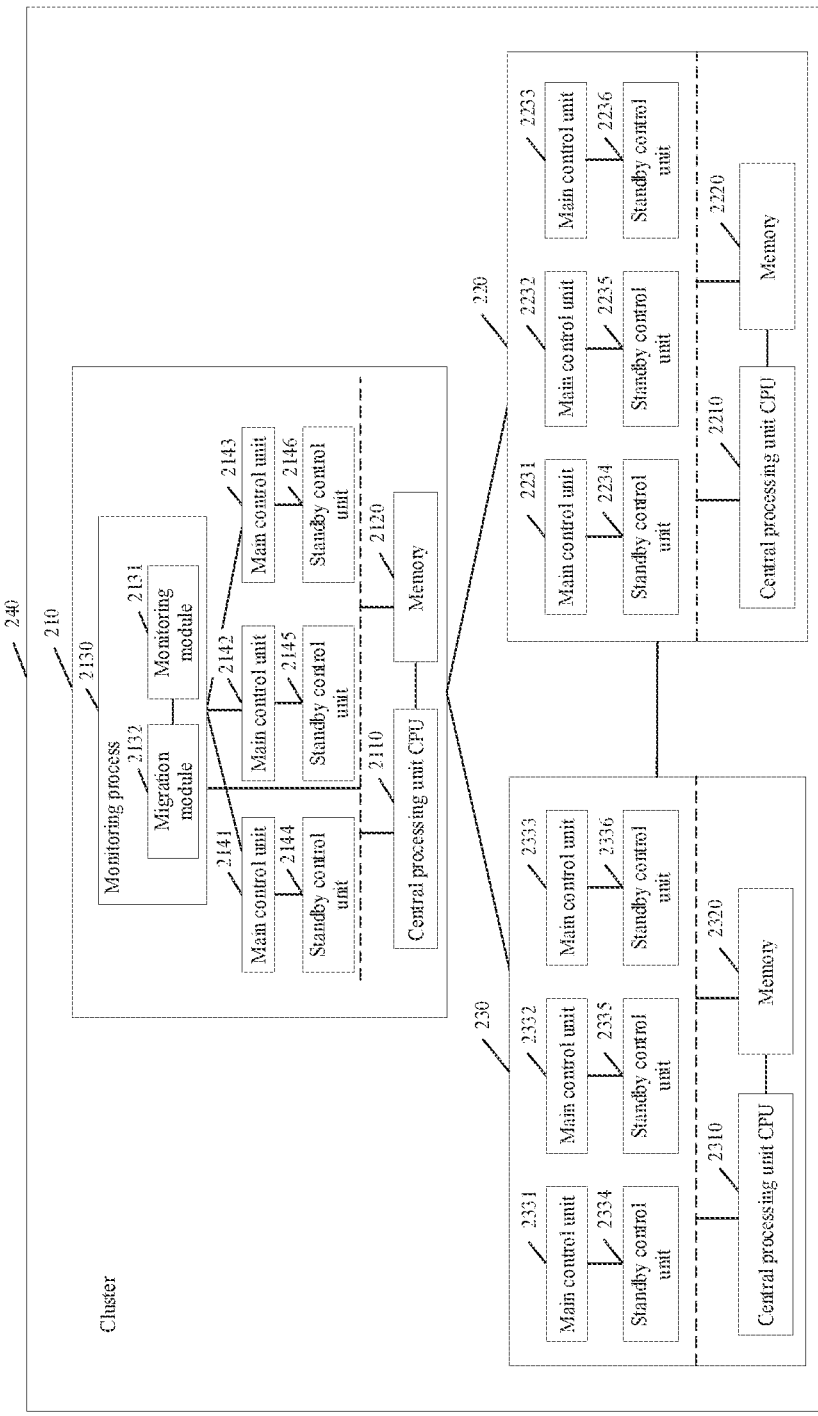
FIG. 2B is a schematic diagram of an internal structure of a cluster according to an embodiment of this application.

FIG. 2B is a schematic diagram of an internal structure of a cluster. Main control units managed by a cluster 240 are simultaneously deployed on the device 210, a device 220, and a device 230, Internal structures of the device 220 and the device 230 are similar to the internal structure of the device 210. A difference is that the device 220 and the device 230 do not include the monitoring process 2130 in the device 210. It should be understood that for a cluster, only one monitoring process needs to be deployed to manage and monitor the cluster. Optionally, the monitoring process may be deployed on any physical device that belongs to the cluster, to monitor and manage the main control units deployed on all physical devices in the cluster. In FIG. 2B, an example in which the monitoring process 2130 is deployed on the device 210 is used for description. Certainly, the monitoring process 2130 may also be deployed on the device 220 or the device 230. The device 210, the device 220, and the device 230 are connected to each other. The monitoring process 2130 in the device 210 may access all the main control units that belong to the cluster 240 and that are in the device 220 and the device 230, and is responsible for monitoring and managing all the main control units in the cluster 240. A total quantity of slots managed by all the main control units in the cluster 240 is 16384. A quantity of slots reflects integrity of the cluster 240. The cluster 240 can properly provide a service only when the total quantity of slots remains 16384. If a main control unit is faulty, because each main control unit is responsible for managing some slots, some slots may be missing. In this case, the total quantity of slots is no longer 16384, in other words, integrity of the cluster 240 is damaged, and the cluster 240 cannot operate properly. The monitoring module 2131 is responsible for monitoring all the main control units in the cluster 240, and identifying hot data in the main control units. The migration module 2132 migrates the hot data identified by the monitoring module 2131, and sends migration information to user equipment connected to the cluster 240. It should be understood that the cluster 240 may further include more network node devices, in other words, the main control units in the cluster 240 may be further deployed on more physical devices. An example in which the cluster 240 includes the device 210, the device 220, and the device 230 is used for description. This should not constitute a specific limitation.

It should be further understood that all main control units in the device 210, the device 220, and the device 230 may be the main control units in the cluster 240, Alternatively, some main control units in the device 210, the device 220, and the device 230 are the main control units in the cluster 240, and other main control units are main control units in a secondary cluster or another cluster. Formation of the secondary cluster is consistent with that of a primary cluster (namely, the duster 240). A CPU in a physical device invokes a program stored in a memory to generate main control units, and then different physical devices select some specific main control units to form a complete secondary cluster. A selection process may be determined based on an IP address and a port. It should be understood that after generating each main control unit, the physical device may actively select and determine a cluster to which the main control unit belongs. For example, after invoking a program stored in a memory 2320 to generate main control units, a CPU 2310 in the device 230 selects a main control unit 2331 and a main control unit 2332 as main control units of a primary cluster, and selects a main control unit 2333 as a main control unit of a secondary cluster.

Figure 2C:
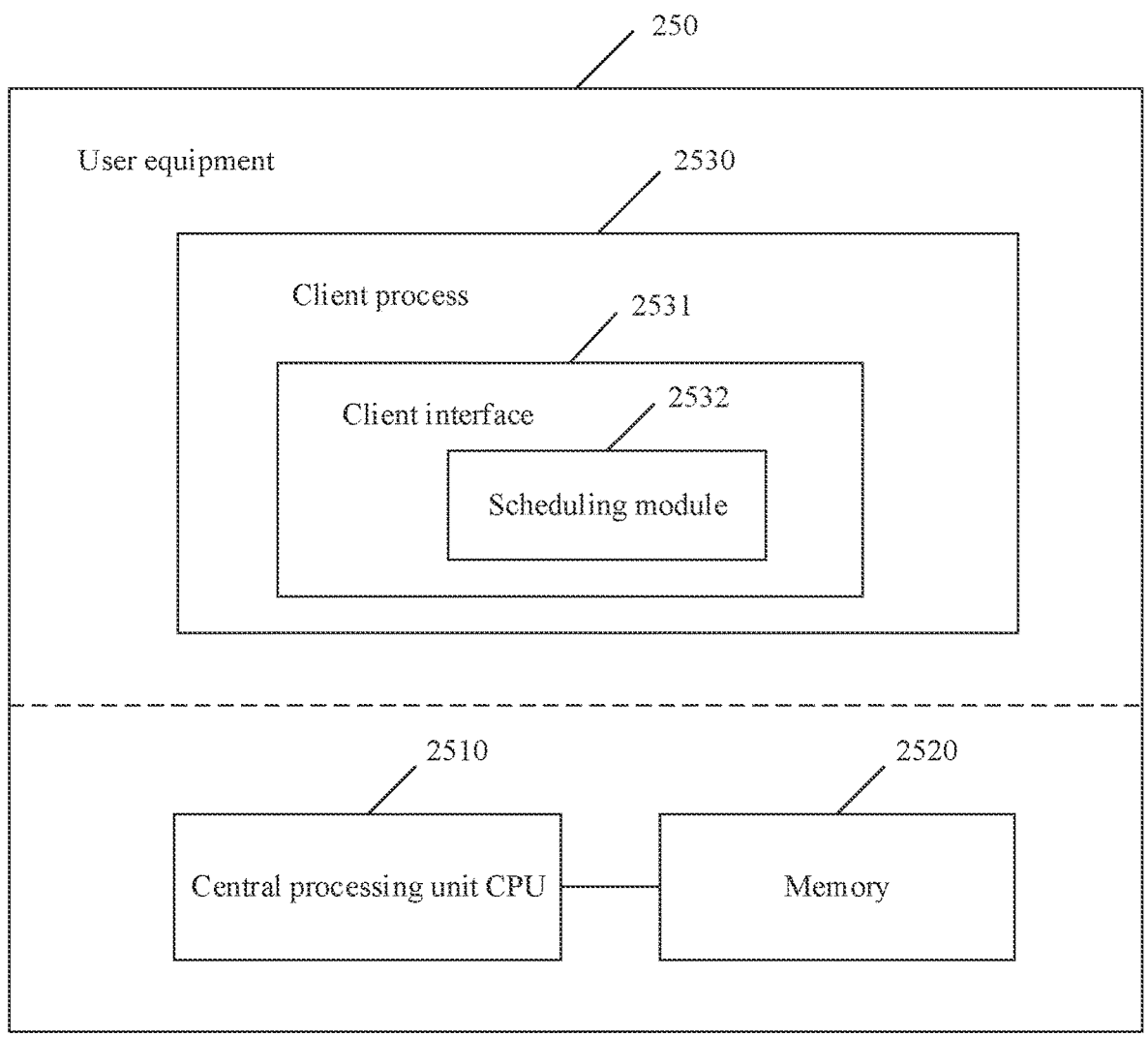
FIG. 2C is a schematic diagram of an internal structure of user equipment according to an embodiment of this application.

FIG. 2C is a schematic diagram of an internal structure of user equipment. It should be understood that FIG. 2C shows only some hardware structures and some software modules in a device 250. During specific implementation, the device 250 may further include more hardware structures such as a power supply, and more software modules such as various applications. The device 250 includes a CPU 2510, a memory 2520, and a client process 2530. The client process 2530 includes a client interface 2531, and the client interface 2531 includes a scheduling module 2532. It should be noted that, in FIG. 2C, below the dashed line are the hardware structures CPU 2510 and memory 2520 of the device 250, and above the dashed line is the client process 2530 implemented by using hardware in the device 250. The CPU 2510 invokes a program in the memory 2520 to implement a function of the scheduling module 2532 in the client process 2530. The memory 2520 is further configured to store data received by the scheduling module 2532. The scheduling module 2532 in the client interface 2531 determines a cluster to which a key in a current service request belongs, and selects a correct cluster for access. The device 250 may use a service provided by the cluster 240 shown in FIG. 2B. The device 250 is connected to the cluster 240 through a network. The scheduling module 2532 may access data managed by any main control unit of the device 210, the device 220, and the device 230. The scheduling module 2532 may further receive the migration information sent by the migration module 2132. For example, the device 210 is connected to the device 250 through the network. Because the device 210, the device 220, and the device 230 are connected to each other, the device 250 may access any main control unit of the device 210, the device 220, and the device 230. In addition, it is assumed that the main control unit 2141 and the main control unit 2142 in the device 210, a main control unit 2231 and a main control unit 2232 in the device 220, and the main control unit 2331 and the main control unit 2332 in the device 230 belong to the primary cluster, and the remaining main control units belong to the secondary cluster. The monitoring module 2131 monitors the primary cluster and the secondary cluster. When detecting that hot data exists in the main control unit 2331 in the primary cluster, the monitoring module 2131 notifies the migration module 2132. The migration module 2132 migrates the hot data in the main control unit 2331 to a main control unit 2233 in the secondary cluster. After the migration, the migration module 2132 sends migration information to the scheduling module 2532 in the device 250, to notify the device 250 that to access the hot data, the device 250 needs to access the main control unit 2233 in the device 220. After receiving the migration information, the scheduling module 2532 stores a key corresponding to the hot data carried in the migration information in a key set, determines the current service request by using the key set, and selects a correct cluster to access.

In this application, main control units in the primary cluster and the secondary cluster are deployed on a plurality of same physical devices, and one physical device is selected to deploy the monitoring process. As shown in FIG. 2B, the device 210, the device 220, and the device 230 may simultaneously deploy the main control units of the primary cluster and the secondary cluster, and the monitoring process 2130 in the device 210 is responsible for monitoring and managing the main control units in the two clusters. The monitoring process is used to monitor and manage all main control units and standby control units in the primary cluster, and monitor and manage all main control units and standby control units in the secondary duster. In other words, the monitoring process monitors and manages both the primary cluster and the secondary cluster. Further, because each main control unit has a unique IP address and port number, the monitoring process may distinguish and establish a connection to each main control unit in the primary cluster and the secondary cluster by using different IP addresses and port numbers. After the connection is established, the monitoring process can use a monitor (monitoring and management) function in a Redis to monitor and manage each connected main control unit. The monitoring process includes a monitoring module and a migration module, After detecting that hot data appears in the primary cluster, the monitoring module notifies the migration module. The migration module migrates the hot data to the secondary cluster, so as to distribute pressure of the primary cluster and implement load balancing between clusters.

Figure 3:
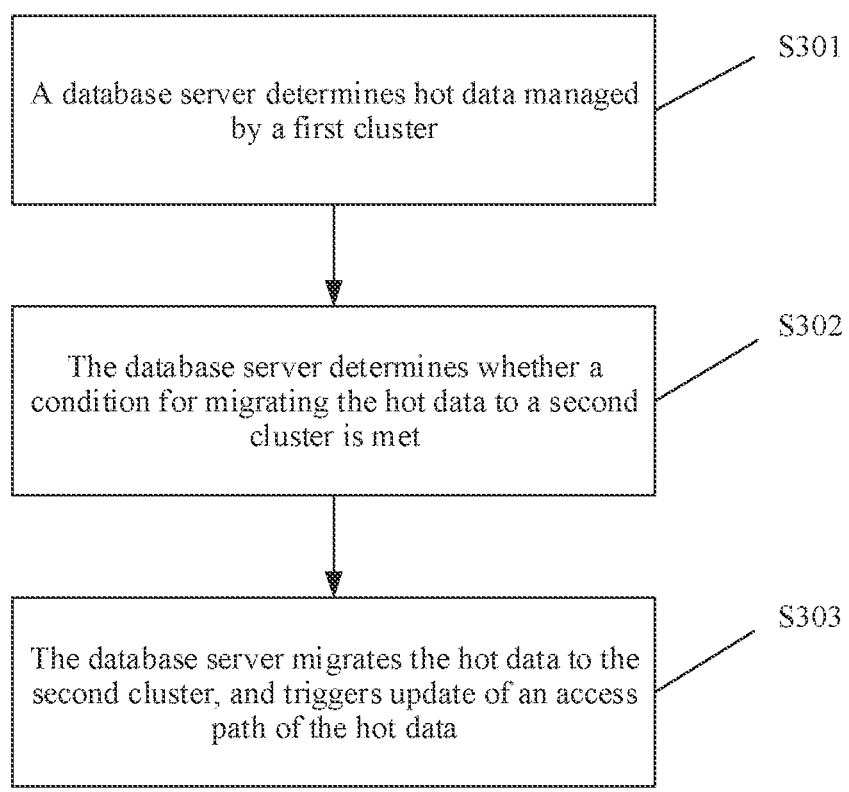
FIG. 3 is a schematic flowchart of a hot data management method according to an embodiment of this application.

With reference to the application scenarios shown in FIG. 2A, FIG. 2B, and FIG. 2C, refer to FIG. 3. FIG. 3 is a schematic flowchart of a hot data management method according to an embodiment of this application. As shown in FIG. 3, the method includes but is not limited to the following steps.

S301: A database server determines hot data managed by a first cluster.

Further, the first cluster may be a Redis cluster, or may be referred to as a primary cluster. The database server herein may be any physical device that forms the Redis cluster and on which a monitoring process is deployed, for example, the device 210 in FIG. 2B. The monitoring process monitors and identifies data managed by the primary cluster, and determines the hot data managed by the primary cluster. Furthermore, a monitoring module in the monitoring process determines the hot data managed by the primary cluster. It should be understood that, in subsequent descriptions of this application, the database server and the monitoring process refer to a same execution subject. In other words, all actions performed by the database server may be understood as actions performed by the monitoring process deployed on the database server. Details are not described or distinguished later.

It should be noted that, the primary cluster performs, by using a hash algorithm, a hash operation on a key corresponding to to-be-stored data to obtain a data result, and uses the data result to take a remainder of 16384. The obtained remainder is an identifier of a slot. Then, the to-be-stored data is stored in a slot with the identifier. In this way, all data can be mapped to slots with different identifiers, and an identifier of each slot is an integer ranging from 0 to 16383. Different integers represent different slots, for example, a slot 1 and a slot 2 are two different slots. The primary cluster includes a total of 16384 slots, and each main control unit is responsible for managing a specific quantity of slots. Each slot is equivalent to a data set, and may include one or more pieces of data. For example, the slot 1 includes all data corresponding to data results in which a taken remainder of 16384 is 1. Each main control unit may be responsible for managing a same quantity of slots, or may manage different quantities of slots according to a weight ratio or the like. This is not limited in this application. Particularly, when the primary cluster performs cluster deployment, main control units are evenly deployed on different physical devices, so as to implement load balancing of the primary cluster and distribute service pressure of a single physical device.

In a possible implementation, the monitoring module in the monitoring process counts a quantity of access times of each piece of data managed by the main control unit within a preset period, and determines data whose quantity of access times exceeds a threshold as the hot data.

Further, the monitoring module may monitor all main control units in the primary cluster in real time or periodically, count a quantity of access times of each piece of data managed by each main control unit, and determine data whose quantity of access times exceeds the threshold as the hot data. The preset period may be a unit time, for example, 1 second. A periodicity and the threshold may be set as required. This is not limited in this application.

In a possible implementation, the monitoring module in the monitoring process calculates resource usage of each main control unit in the primary cluster, monitors a main control unit whose resource usage exceeds a first threshold, counts a quantity of access times of each piece of data managed by the main control unit whose resource usage exceeds the first threshold within a preset period, and determines data whose quantity of access times exceeds a second threshold as the hot data.

Further, the monitoring module in the monitoring process may obtain a value of the first threshold through estimation based on a hardware status of a physical device, such as a quantity of CPUs, a CPU capability, a physical memory size, and a network capability of the physical device, and cluster configuration information, such as a quantity of main control units deployed on each physical device. Current resource usage of each main control unit, for example, CPU resource usage or physical memory usage, is compared with an estimated first threshold, and the main control unit whose resource usage exceeds the first threshold is monitored.

Further, after determining the main control unit whose resource usage exceeds the first threshold, the monitoring module counts a quantity of access times of each piece of data in each slot managed by the main control unit within the preset period, and if the quantity of access times of a piece of data exceeds the second threshold, the data is determined as the hot data. The preset period may be a unit time, for example, 1 second. The second threshold may be set as required. This is not limited in this application.

For example, refer to FIG. 2B, the monitoring module 2131 determines that the resource usage of the main control unit 2141 exceeds the first threshold, and monitors the main control unit 2141. The main control unit 2141 manages 1000 slots, which are slot 1 to slot 1000. Each slot includes 10 pieces of data, and the second threshold is 50000. The monitoring module counts a quantity of access times of each piece of data in each slot within 1 second. Ha second piece of data in the slot 1 is accessed for 80,000 times within 1 second, which exceeds the second threshold 50000, it may be determined that the second piece of data in the slot 1 is the hot data.

It may be understood that, when the monitoring module monitors a cluster, performance of the cluster is affected and consumed. Therefore, when the hot data is determined, the monitoring module is not used to monitor all main control units in the primary cluster, but used to perform filtering first. The monitoring module is only responsible for monitoring the main control unit whose resource usage exceeds the first threshold. This can reduce performance loss of the cluster, and ensure that the primary cluster can better provide a service.

S302: The database server determines whether a condition for migrating the hot data to a second cluster is met.

Further, the second cluster may be a Redis cluster, or may be referred to as a secondary cluster. The secondary cluster may include a plurality of physical devices, and the physical devices are connected to each other through a network. For a specific structure of each physical device, refer to related descriptions in FIG. 2A, It should be noted that a physical device used to establish the second cluster may be a physical device used to establish the first cluster. In other words, a same physical device may be used to establish the primary cluster and the secondary cluster. Because physical devices used to establish the primary cluster and the secondary cluster are the same, for a same physical device, both a main control unit in the primary cluster and a main control unit in the secondary cluster may be deployed on the physical device. For example, in FIG. 2B, the main control units 2141 and 2142 in the device 210, the main control units 2231 and 2232 in the device 220, and the main control units 2331 and 2332 in the device 230 may be main control units in the primary cluster, and the main control unit 2143 in the device 210, the main control unit 2233 in the device 220, and the main control unit 2333 in the device 230 may be main control units in the secondary cluster. In addition, a quantity of main control units in the secondary cluster may be the same as a quantity of main control units in the primary cluster, and identifiers of slots managed by each main control unit may also be the same. Certainly, the quantity of main control units and the identifiers of the slots managed by each main control unit may alternatively be different. This is not limited in this application.

Optionally, one or more standby control units may also be configured for each main control unit in the secondary cluster. The secondary cluster and the primary cluster each include 16384 slots, and each slot may include at least one piece of data.

In a possible implementation, a first main control unit in the primary cluster and a first main control unit in the secondary cluster are deployed on different physical devices, and slots managed by the first main control unit in the primary cluster and slots managed by the first main control unit in the secondary cluster have a same identifier.

Further, the primary cluster and the secondary cluster cooperate with each other, and the secondary cluster is used to receive hot data migrated from the primary cluster, to distribute service pressure of the primary cluster. In addition, in a migration process of the hot data, a key corresponding to the hot data does not change. Therefore, an identifier of a slot obtained by performing hash calculation based on the key is also the same. In other words, if hot data in a slot 1 in the primary cluster is migrated to the secondary cluster, the hot data is definitely migrated to a slot 1 in the secondary cluster, and is not migrated to a slot with another identifier, for example, a slot 2 or a slot 3.

Therefore, during cluster deployment, if main control units responsible for slots with a same identifier in two clusters are deployed on a same physical device, hot data migration is completed inside the physical device, that is, for the physical device, service pressure is still concentrated on the physical device, and is not decreased. Therefore, main control units that are in the two clusters and that are responsible for managing slots with a same identifier need to be deployed on different physical devices. Further, each physical device (for example, the database server) may select, based on an address and a port number, main control units that form the primary cluster and the secondary cluster. Because the physical device may distinguish between different main control units in different clusters by using the IP address and the port number, during slot deployment, main control units that manage slots with a same identifier may be selected to be deployed on different physical devices. For example, if there are 10 main control units on a physical device, eight of the main control units are selected as the main control units in the primary cluster, and the other two are selected as the main control units in the secondary cluster. During slot deployment (the primary cluster and the secondary cluster each manage 16384 slots), the physical device may select the eight main control units in the primary cluster to manage slots whose identifiers are 1 to 5000, and select the two main control units in the secondary cluster to manage slots whose identifiers are 5001 to 10000, so as to ensure that identifiers of slots managed by main control units in different clusters are different. It may be understood that, in this way, cluster load can be more balanced, impact of the hot data on a single physical device can be reduced, and service pressure can be prevented from being concentrated on a same physical device.

Figure 4:
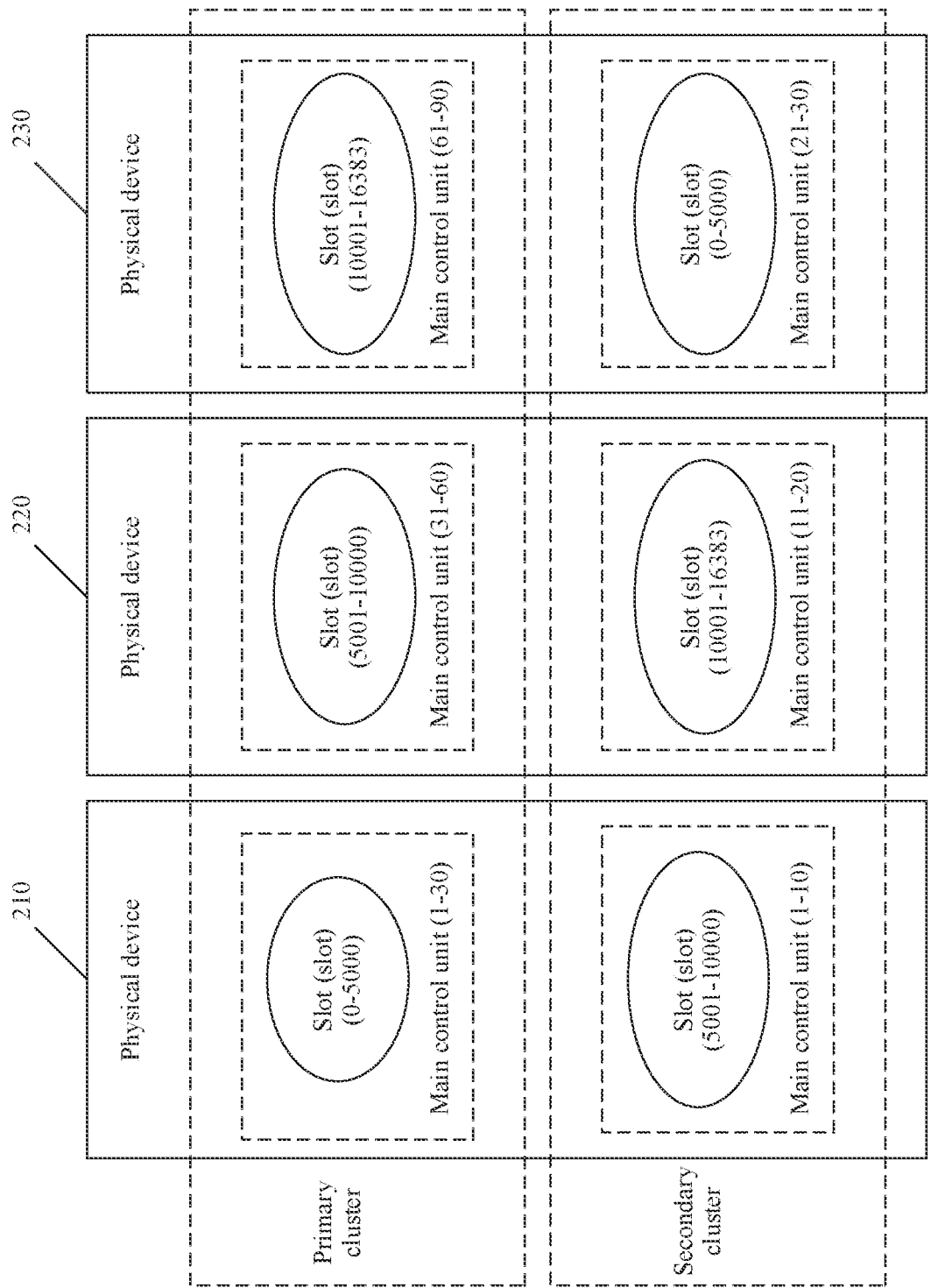
FIG. 4 is a schematic diagram of a cluster deployment according to an embodiment of this application.

For example, refer to FIG. 4. FIG. 4 is a schematic diagram of a cluster deployment according to an embodiment of this application. As shown in FIG. 4, in a specific implementation, the primary cluster includes 90 main control units. 30 main control units responsible for slot 0 to slot 5000 are deployed on the physical device 210. Another 30 main control units responsible for slot 5001 to slot 10000 are deployed on the physical device 220. The last 30 main control units responsible for slot 10001 to slot 16383 are deployed on the physical device 230. The secondary cluster includes 30 main control units. 10 main control units responsible for slot 0 to slot 5000 are deployed on the physical device 230. Another 10 main control units responsible for slot 5001 to slot 10000 are deployed on the physical device 210. The last 10 main control units responsible for slot 10001 to slot 16383 are deployed on the physical device 220. It can be learned that the 30 main control units responsible for slot 0 to slot 5000 in the primary cluster and the 10 main control units responsible for slot 5001 to slot 10000 in the secondary cluster are simultaneously deployed on the physical device 210. When data in the slot 100 in the primary duster is determined as hot data, the data needs to be migrated to the slot 100 in the secondary cluster. Because the slot 100 in the primary cluster is deployed on the physical device 210, and the slot 100 in the secondary cluster is deployed on the physical device 230, the data is actually migrated from the physical device 210 to the physical device 230. It is easy to understand that, in the foregoing deployment manner, cluster load can be more balanced, and service pressure can be prevented from being on a same physical device. In addition, the 30 main control units in the secondary cluster are used to assist the primary cluster, and are used to store hot data determined in the primary cluster. Compared with that the primary cluster has 90 main control units, the secondary cluster has only 30 main control units. This does not occupy excessive resources, and can reduce impact on the physical device 210, the physical device 220, and the physical device 230 while ensuring high performance of the primary cluster.

It may be understood that hot data is migrated from the primary cluster to the secondary cluster, so that service pressure of the primary cluster can be distributed, load of the primary cluster can be more balanced, and high performance and reliability of the primary cluster can be ensured. Further, the monitoring process in the database server may identify each main control unit by using an IP address and a port number and establish a connection to the main control unit. After the connection is established, the monitoring process may monitor the main control unit by using a monitor function. When detecting hot data, the monitoring process may read the hot data and a key corresponding to the hot data, and migrate the hot data and the key corresponding to the hot data that are read to the secondary cluster. It should be noted that the migration herein is similar to a backup operation, that is, after the migration, the hot data and the key corresponding to the hot data still exist in the primary cluster.

In a possible implementation, statistics are collected on a main control unit whose resource usage (for example, CPU resource usage) exceeds the first threshold and in which hot data exists, and a total quantity of access times of all data managed by the main control unit is counted. If the total quantity of access times exceeds a third threshold, it is determined that the main control unit meets a migration condition, and the hot data managed by the main control unit is migrated to the secondary cluster.

Further, the total quantity of access times of all data (including hot data and non-hot data) managed by the main control unit is counted, and a current status of the main control unit and whether the hot data needs to be migrated may be determined based on the total quantity of access times. When the total quantity of access times exceeds the third threshold, it indicates that there are excessive current access requests, and security and reliability of the main control unit are threatened, that is, the main control unit has a risk of being broken down. Further, because hot data exists in data managed by the main control unit, that is, data whose quantity of access times exceeds the second threshold exists. In this case, the hot data managed by the main control unit needs to be migrated to the secondary cluster, so as to distribute service pressure of the main control unit, and avoid breakdown of the main control unit. Optionally, the third threshold may be set as required. This is not limited in this application.

Particularly, when the monitoring module in the monitoring process detects that a plurality of pieces of hot data exist in the main control unit that meets the migration condition, for example, in FIG. 213, the monitoring module 2131 detects that the main control unit 2141 meets the migration condition, and a plurality of pieces of hot data exist in data managed by the main control unit 2141, if all hot data is migrated to the secondary cluster, the secondary cluster receives a large quantity of access requests sent by a client within a short period of time, and the main control unit in the secondary cluster faces huge service pressure. Consequently, the main control unit in the secondary cluster may be broken down and cannot operate properly, a physical device on which the main control unit in the secondary cluster is deployed is further broken down, and the entire secondary cluster cannot provide a service.

Optionally, the monitoring module performs priority classification on the hot data. When detecting that a plurality of pieces of hot data exist in the main control unit that meets the migration condition in the primary cluster, the monitoring module migrates the hot data to the secondary cluster according to a priority. Hot data with a highest priority may be first migrated to the secondary cluster. Then, the monitoring module monitors a status of the secondary cluster, and determines, based on the status of the secondary cluster, whether to migrate hot data with a lower priority to the secondary cluster. This can avoid that excessive hot data is migrated to the secondary cluster at a time, and the secondary cluster breaks down due to the impact of the large quantity of access requests within a short period of time and cannot provide a service, thereby implementing load balancing between the primary cluster and the secondary cluster.

For example, the monitoring module obtains, through statistics collection, that within 1 second, data 1 managed by the main control unit that meets the migration condition in the primary cluster is accessed for 150,000 times, data 2 is accessed for 130,000 times, and data 3 is accessed for 100,000 times. Data that is accessed for more than 50,000 times is determined as hot data (that is, the second threshold is 50,000). All of the data 1, the data 2, and the data 3 are accessed for more than 50,000 times. Therefore, the data 1, the data 2, and the data 3 are hot data. Because the data 1 is accessed for a maximum quantity of times, a priority of the data 1 is the highest. Therefore, the monitoring module marks the data 1 as hot data of a high priority, and similarly marks the data 2 as hot data of a medium priority or a normal priority, and marks the data 3 as hot data of a low priority. The migration module may migrate the data 1, the data 2, and the data 3 to the secondary cluster according to the priorities. For example, current service pressure of the current secondary cluster is relatively high, that is, excessive hot data exists in the current secondary cluster, and a quantity of pieces of hot data exceeds a preset value. For example, if the preset value is 1000, it indicates that the secondary cluster can manage only 1000 pieces of hot data in a normal case, but 1050 pieces of hot data exists in the current secondary cluster. In this case, service pressure of the secondary cluster is relatively high. In this case, only the data 1 may be migrated to the secondary cluster, and the data 2, and the data 3 are not migrated to the secondary cluster temporarily. If the service pressure of the current secondary cluster is relatively low, all of the data 1, the data 2, and the data 3 may be migrated to the secondary cluster.

It should be understood that priority classification is performed herein only based on a quantity of access times of the hot data, and priority classification may also be performed according to another rule or condition, for example, select, based on a service importance level, data that needs to be migrated. This is not limited in this application.

S303: The database server migrates the hot data to the second cluster, and triggers update of an access path of the hot data.

Further, each main control unit corresponds to a unique IP address and port number. All main control units in a same physical device (including the main control units in the primary cluster and the main control units in the secondary cluster) have a same IP address, but have different port numbers. Main control units in different physical devices have different IP addresses, but may have a same port number. With reference to the IP address and the port number, a unique main control unit may be determined, that is, the monitoring process performs monitoring by using the IP address and the port number, and manages each main control unit in the primary cluster and the secondary cluster based on the IP address and the port number.

Further, after determining the hot data that needs to be migrated in the primary cluster, the monitoring module deployed in the database server notifies the migration module, and the migration module reads the hot data and the key corresponding to the hot data from the primary cluster. After reading the hot data and the key corresponding to the hot data, the migration module performs a hash operation on the read key by using a hash algorithm, to obtain an identifier corresponding to a slot. The migration module may determine, based on the identifier, a main control unit that is in the secondary cluster and that manages the slot corresponding to the identifier, and may further obtain an address and a port number that are corresponding to the main control unit. It should be noted that, when the primary cluster and the secondary cluster are established, the monitoring process has stored an IP address and a port number that are corresponding to each main control unit. After obtaining an IP address and a port number, the migration module writes the hot data and the key corresponding to the hot data into a slot corresponding to a slot identifier obtained through calculation. The slot is a slot in slots managed by a main control unit corresponding to the IP address and the port number in the secondary cluster. It should be noted that a migration process and implementation logic of the hot data and the key corresponding to the hot data are consistent with a data migration process in the conventional technology. Details are not described herein again.

In a possible implementation, after completing hot data migration, the migration module sends migration information to a client communicating with the primary cluster and the secondary cluster. The migration information includes the key corresponding to the hot data, and the migration information indicates the client to record the key corresponding to the hot data in a key set. The key set includes keys corresponding to all hot data migrated from the primary cluster to the secondary cluster.

Further, only after migrating the hot data in the primary cluster to the secondary cluster, the migration module sends the migration information to the client communicating with the primary cluster and the secondary cluster, to notify the client. The migration information may be sent in a form of a network packet. Optionally, the client and the migration module may negotiate to define some related protocols, so as to ensure that the client can correctly interpret the migration information after receiving the migration information, obtain the key corresponding to the hot data in the migration information, and add the key to the key set. Alternatively, a dedicated connection (for example, a TCP connection) is established between the migration module and the client, to send the migration information, so as to ensure that the client can correctly interpret the migration information, obtain the key corresponding to the hot data in the migration information, and add the key to the key set.

It should be noted that both the primary cluster and the secondary cluster store data by using a key-value, and each key corresponds to a unique value. In other words, the main control unit needs to manage not only a value of data, but also a key corresponding to the data. The key may also be referred to as a keyword. This is not distinguished in the following description.

Further, after the migration module completes the hot data migration, a storage location of the hot data changes, that is, information such as a storage address of the hot data changes. If the client still sends an access request to the primary cluster in a previous manner, to request to access the hot data, the client cannot successfully access the hot data. Therefore, the migration module needs to send a notification message (namely, the migration information) to all clients communicating with the primary cluster and the secondary cluster, to notify all the clients that the hot data has been migrated to the secondary cluster. The client maintains a key set. After receiving the migration information, the client adds the key corresponding to the hot data in the migration information to the key set. If the client generates a service request, the client determines whether a key in the service request is a key in the key set, and if yes, sends an access request to the secondary cluster, or if no, sends an access request to the primary cluster.

Further, the migration module needs to ensure that all the clients communicating with the primary cluster and the secondary cluster receive the migration information, to avoid that some clients cannot correctly access the hot data because these clients do not receive the migration information. Optionally, the migration module and the client may use a reply acknowledgment mechanism to ensure that all the clients receive the migration information. To be specific, after sending the migration information to all the clients communicating with the primary cluster and the secondary cluster, the migration module receives acknowledgment messages returned by all the clients. If the migration module receives, within a preset period, acknowledgment messages returned by all the clients, it may be determined that all the clients have successfully received the migration information. If the migration module receives, within the preset period, no acknowledgment messages returned by the clients or receives acknowledgment messages returned by some clients, it indicates that not all the clients have successfully received the migration information. In this case, the migration module needs to repeat the foregoing process, and sends the migration information to all the clients again until the acknowledgment messages returned by all the clients are received within the preset period. It may be understood that the migration module may alternatively use another acknowledgment manner or acknowledgment mechanism to ensure that all the clients receive the migration information. This is not limited in this application.

It can be learned that the foregoing method embodiment may be performed to migrate the hot data in the primary cluster to the secondary cluster, so as to distribute the service pressure of the primary cluster, and avoid breakdown of the main control unit in the primary cluster and even breakdown of the physical device on which the main control unit is deployed due to excessive service pressure in the primary cluster. This implements load balancing between the primary cluster and the secondary cluster, and ensures high performance and reliability of the primary cluster. In addition, it can be ensured that the client communicating with the primary cluster and the secondary cluster can select a correct cluster for access, thereby ensuring high service reliability.

It should be understood that steps S301 to S303 in the foregoing method embodiment are merely general schematic descriptions, and should not constitute a specific limitation. The related steps may be added, reduced, or combined based on a requirement.

Figure 5:
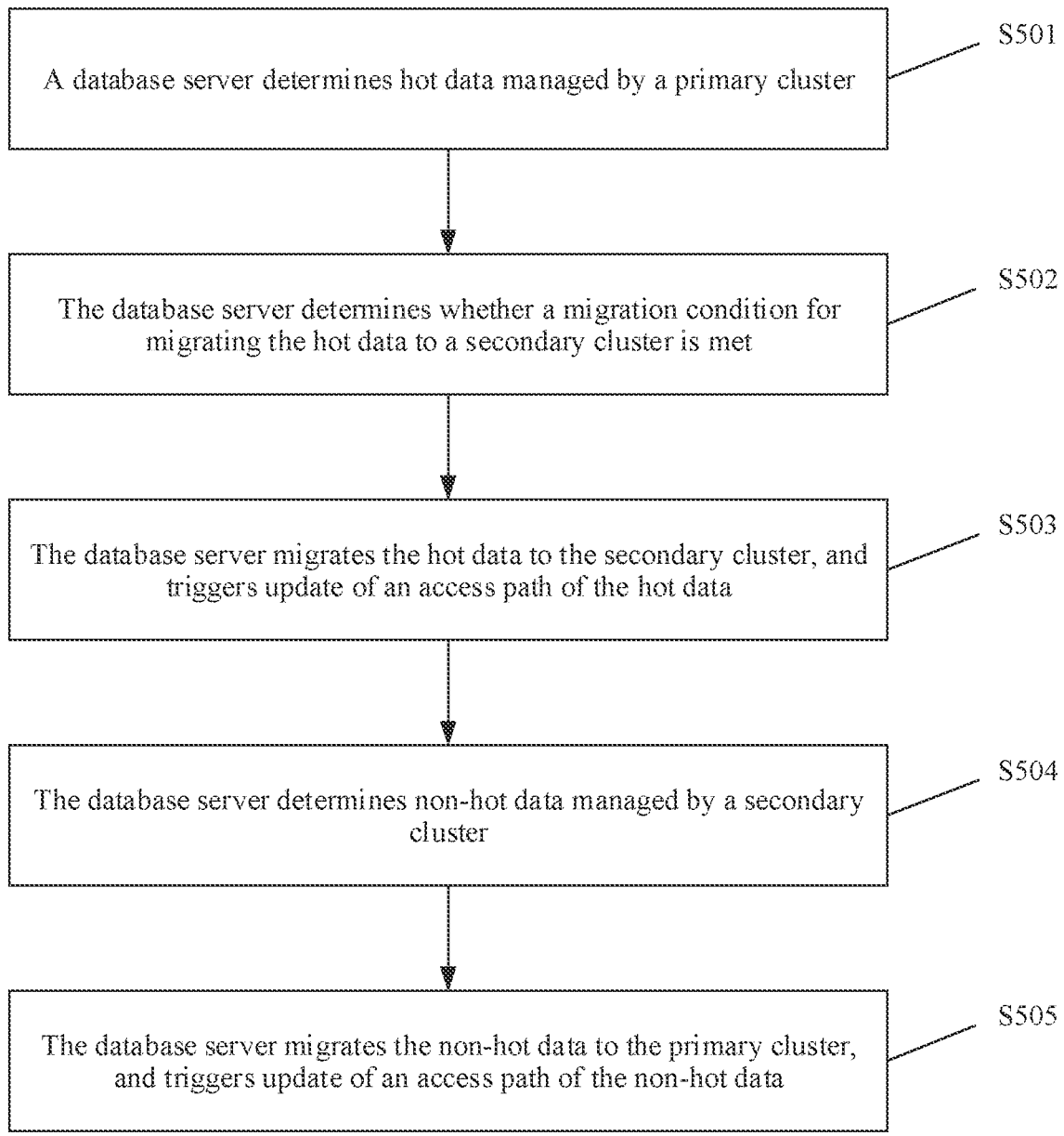
FIG. 5 is a schematic flowchart of another hot data management method according to an embodiment of this application.

With reference to the application scenarios shown in FIG. 2A, FIG. 2B, and FIG. 2C, refer to FIG. 5. FIG. 5 is a schematic flowchart of another hot data management method according to an embodiment of this application. As shown in FIG. 5, the method includes but is not limited to the following steps.

S501: A database server determines hot data managed by a primary cluster.

Further, for a process of identifying and determining the hot data, refer to related descriptions in S301. For brevity, details are not described herein again.

S502: The database server determines whether a migration condition for migrating the hot data to a secondary cluster is met.

Further, for a determining process, refer to related descriptions in S302. For brevity, details are not described herein again.

S503: The database server migrates the hot data to the secondary cluster, and triggers update of an access path of the hot data.

In a possible implementation, after completing hot data migration, a migration module sends first migration information to a client communicating with the primary cluster and the secondary duster. The first migration information includes the hot data and a key corresponding to the hot data, and the first migration information indicates the client to record the hot data and the key corresponding to the hot data in a first set.

Further, the migration module reads the hot data and the key corresponding to the hot data from the primary cluster, and then writes the hot data and the key corresponding to the hot data into a slot managed by the secondary cluster. For a specific migration process, refer to related descriptions in S303. Details are not described herein again. However, it should be noted that in a migration process of the migration module, some clients may perform a write operation on the hot data, and the write operation causes the hot data to change. In other words, the hot data read by the migration module from the primary cluster is inconsistent with hot data in the primary cluster at a current moment, that is, the hot data written by the migration module into the secondary cluster is inconsistent with the hot data in the primary cluster. In addition, if the hot data changes in the migration process, the migration module cannot sense that the hot data in the primary cluster has changed. After writing the hot data and the key corresponding to the hot data into the secondary cluster, the migration module sends, to all clients communicating with the primary cluster and the secondary cluster, the first migration information that carries the hot data and the key corresponding to the hot data. The hot data in the first migration information is inconsistent with the hot data in the primary cluster at the current moment.

Further, the client maintains a first set. The first set is a data buffer set, and the first set includes all hot data that is migrated from the primary cluster to the secondary cluster and on which data consistency verification is not performed and a key corresponding to the hot data. That is, the first set includes the hot data carried in the first migration information and the key corresponding to the hot data. The first set is used to cooperate with a monitoring process to ensure data consistency After the client receives the first migration information and writes the hot data and the key corresponding to the hot data that are carried in the migration information into the first set or when the client generates an access request for the hot data, a scheduling module in the client accesses the hot data managed by the primary cluster, to compare whether the hot data in the first set is consistent with the hot data managed by the primary cluster, so as to determine whether the hot data changes in the migration process. If the hot data is consistent, it indicates that the migration succeeds, that is, the hot data does not change in the migration process, the hot data migrated to the secondary cluster is consistent with the hot data managed by the original primary cluster, and all access requests for the hot data directly access the secondary cluster. If the hot data is inconsistent, it indicates that the migration fails, that is, the hot data changes in the migration process, the hot data migrated to the secondary cluster is inconsistent with the hot data managed by the original primary cluster, and all access requests for the hot data still access the primary cluster. The monitoring process deployed in the database server may determine whether to re-migrate the hot data.

It should be understood that for some specific implementation details of S503, refer to related descriptions in step S303. For brevity, details are not described herein again.

S504: The database server determines non-hot data managed by the secondary cluster.

Further, a monitoring module monitors all main control units managed by the secondary cluster, counts a quantity of access times of data managed by each main control unit within a preset period, and when the quantity of access times is less than a fourth threshold, determines that the data is non-hot data. The preset period may be a unit time, for example, 1 second. The fourth threshold may be set as required, and may be set to a value the same as the second threshold, or may be set to a value less than the second threshold. This is not limited in this application.

Optionally, the monitoring module may monitor in real time, or monitor periodically according to a specific periodicity, all the main control units managed by the secondary cluster. The periodicity may be set as required. This is not limited in this application. It should be noted that data managed by the secondary cluster is less than that of the primary cluster, so that service pressure of the secondary cluster is relatively small. Therefore, monitoring, in real time or periodically, all the main control units managed by the secondary cluster does not greatly affect performance of the secondary cluster. The secondary cluster can still properly provide a service. This is different from the primary cluster.

It should be noted that there is no logical sequence between S503 and S504. That is, S503 may be first performed and then S504 is performed. Alternatively, S504 is first performed and then S503 is performed. Alternatively, S503 and S504 are performed simultaneously. This is not limited in this application.

S505: The database server migrates the non-hot data to the primary cluster, and triggers update of an access path of the non-hot data.

Further, after determining the non-hot data in the secondary cluster, the monitoring module needs to migrate the non-hot data to the primary cluster, to reduce service pressure of the secondary cluster. The migration module reads the non-hot data and a key corresponding to the non-hot data from the secondary cluster. Then, the migration module performs, by using a hash algorithm, a hash calculation on the read key corresponding to the non-hot data, to determine an identifier corresponding to a slot. A main control unit that is in the primary cluster and that manages the slot corresponding to the identifier may be determined based on the identifier, and an IP address and a port number that are corresponding to the main control unit may be further obtained. The monitoring module may find, in the primary cluster based on the obtained IP address and port number, the main control unit corresponding to the IP address and the port number, and then write the non-hot data and the key corresponding to the non-hot data into a slot that is managed by the main control unit and that is corresponding to the calculated slot identifier.

It should be understood that the migration module migrates the hot data and the key corresponding to the hot data to the secondary cluster and the migration module migrates the non-hot data and the key corresponding to the non-hot data to the primary cluster are a pair of opposite processes. For specific migration details and the like, refer to related descriptions in S303.

In a possible implementation, after migrating the non-hot data from the secondary cluster to the primary cluster, the migration module sends second migration information to the client communicating with the primary cluster and the secondary cluster. The second migration information includes the non-hot data and the key corresponding to the non-hot data, and the second migration information indicates the client to record the non-hot data and the key corresponding to the non-hot data in a second set.

Further, similar to the process in which the migration module migrates the hot data and the key corresponding to the hot data to the secondary cluster, in a process in which the migration module migrates the non-hot data, some clients may perform a write operation on the non-hot data, and the write operation causes the non-hot data to change. In other words, the non-hot data read by the migration module from the secondary cluster is inconsistent with non-hot data in the secondary cluster at a current moment. The non-hot data written by the migration module into the primary cluster is inconsistent with the non-hot data in the secondary cluster. In addition, if the non-hot data changes in the migration process, the migration module cannot sense that the non-hot data in the secondary cluster has changed. After writing the non-hot data and the key corresponding to the non-hot data into the primary cluster, the migration module sends, to all clients communicating with the primary cluster and the secondary cluster, the second migration information that carries the non-hot data and the key corresponding to the non-hot data. The non-hot data in the second migration information is inconsistent with the non-hot data in the secondary cluster at the current moment.

Further, the client maintains a second set. The second set is also a data buffer set, and the second set includes all non-hot data that is migrated from the secondary cluster to the primary cluster and on which data consistency verification is not performed and a key corresponding to the non-hot data. That is, the second set includes the non-hot data carried in the second migration information and the key corresponding to the non-hot data. The second set is also used to cooperate with the monitoring process to ensure data consistency. After the client receives the second migration information and writes the non-hot data and the key corresponding to the non-hot data that are carried in the migration information into the second set or when the client generates an access request for the non-hot data, the scheduling module in the client accesses the non-hot data managed by the secondary cluster, to compare whether the non-hot data in the second set is consistent with the non-hot data managed by the secondary cluster at the current moment, so as to determine whether the non-hot data changes in the migration process. If the non-hot data is consistent, it indicates that the migration succeeds, that is, the non-hot data does not change in the migration process, the non-hot data migrated to the primary cluster is consistent with the non-hot data managed by the secondary cluster, and all access requests for the non-hot data directly access the primary cluster. If the non-hot data is inconsistent, it indicates that the migration fails, that is, the non-hot data changes in the migration process, the non-hot data migrated to the primary cluster is inconsistent with the non-hot data managed by the secondary cluster, and all access requests for the non-hot data in the client still access the secondary cluster. The monitoring process deployed in the database server may determine whether to re-migrate the non-hot data.

It should be noted that the foregoing data consistency determining process is executed and implemented by a client side, or the migration module may complete data consistency determining. Further, after completing data migration, the migration module directly determines whether data before the migration is consistent with data in the original cluster after the migration is consistent. For example, for hot data, after migrating the hot data to the secondary cluster, the migration module determines whether the hot data in the primary cluster before the migration is consistent with the hot data in the primary cluster after the migration is consistent. If the hot data is consistent, it indicates that the data does not change, and the migration module sends a migration information to all the clients communicating with the first cluster and the second cluster. The migration message includes a key corresponding to the hot data. After receiving the migration information, the client updates the key corresponding to the hot data to a key set. If the hot data is inconsistent, it indicates that the data changes, and the migration fails.

It should be understood that steps S501 to S505 in the foregoing method embodiment are merely general schematic descriptions, and should not constitute a specific limitation. The related steps may be added, reduced, or combined based on a requirement. In addition, for specific details in the method embodiment in FIG. 5, refer to related descriptions in S301 to S303. For brevity, details are not described herein again.

Figure 6A:
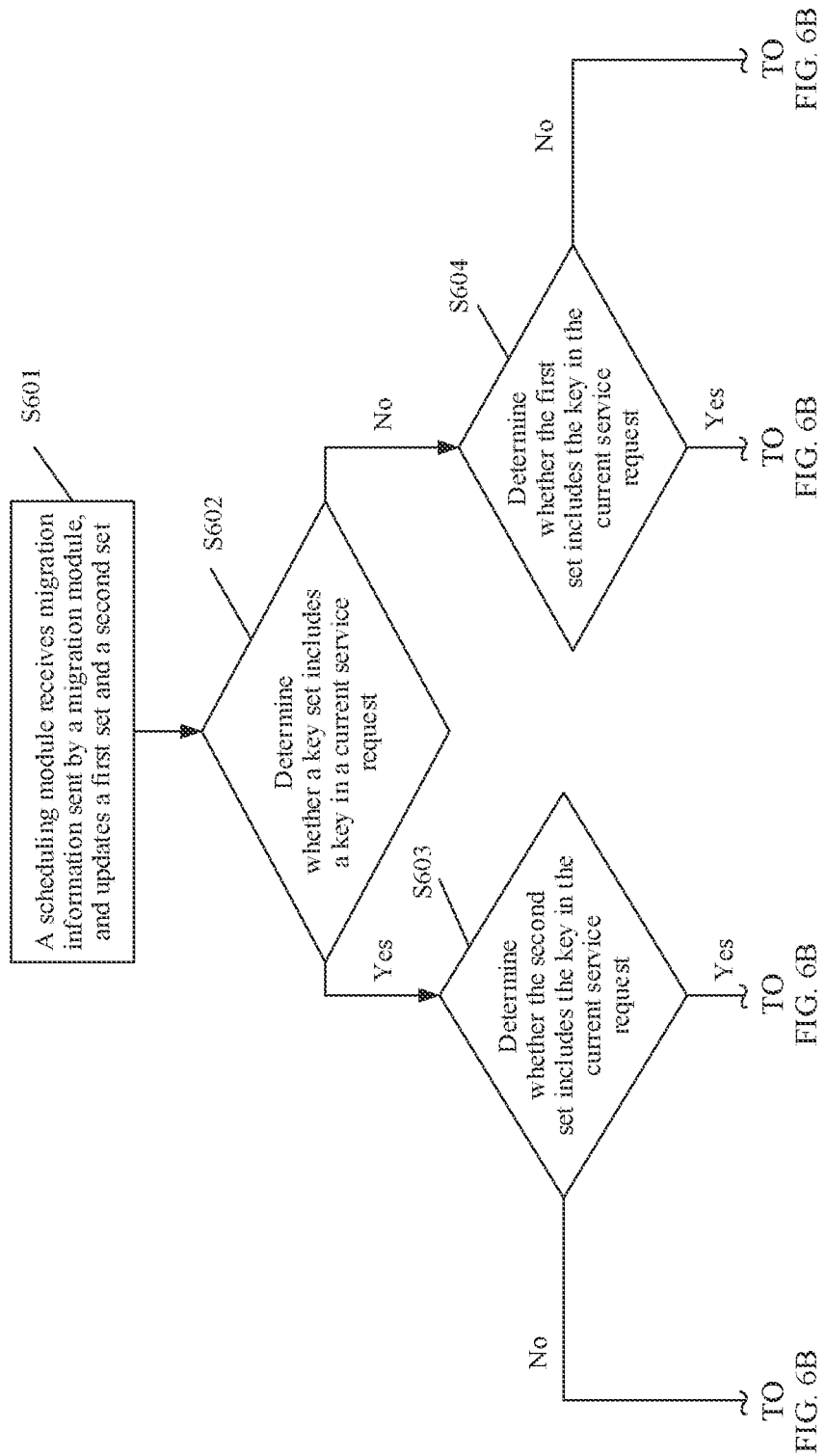
FIG. 6A and FIG. 6B are a schematic flowchart of a data consistency check method according to an embodiment of this application.
Figure 6B:
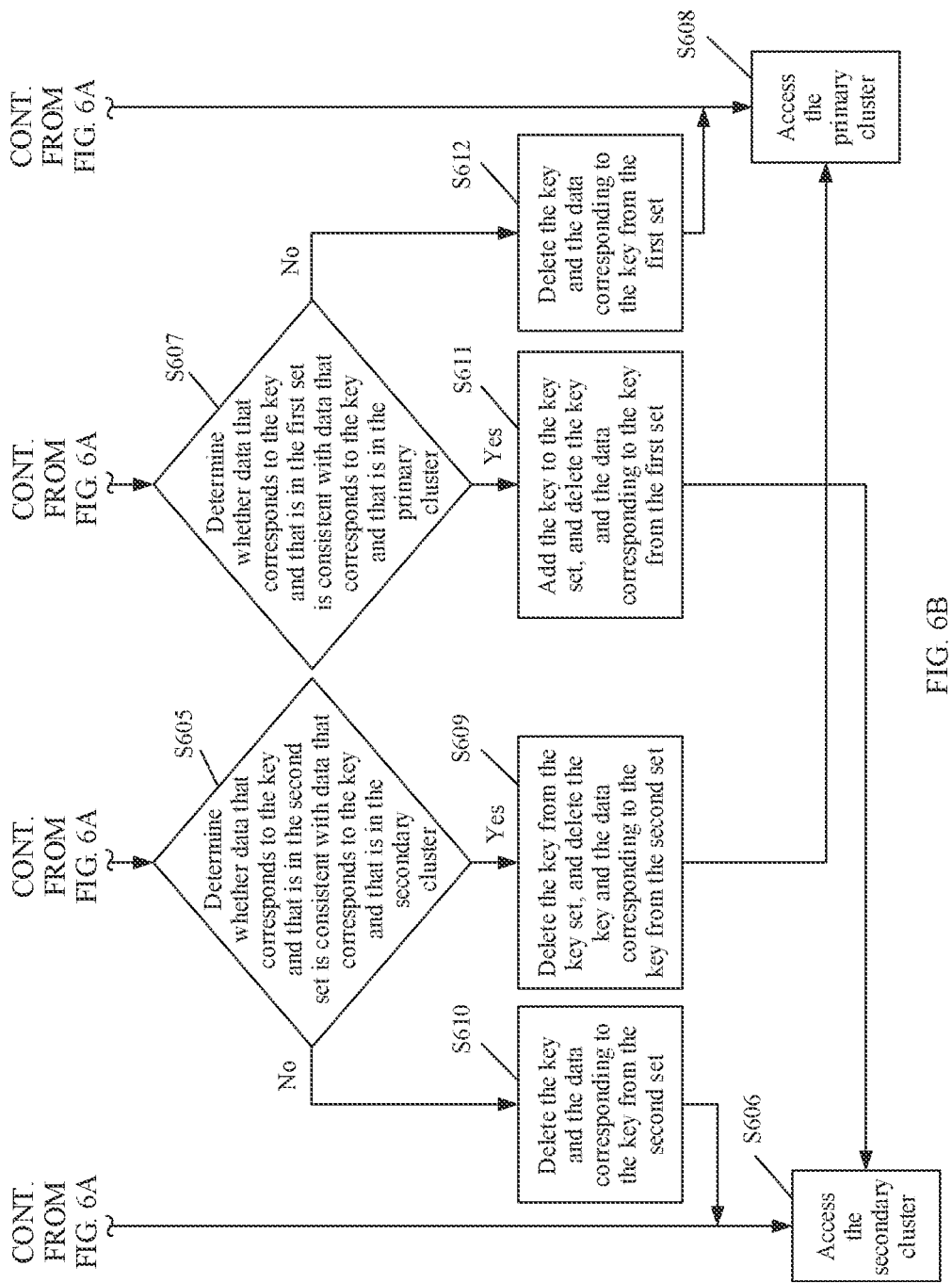

With reference to the application scenarios shown in FIG. 2A, FIG. 2B, and FIG. 2C, refer to FIG. 6A and FIG. 6B. FIG. 6A and FIG. 6B are a schematic flowchart of a data consistency check method according to an embodiment of this application. As shown in FIG. 6A and FIG. 6B, the method includes but is not limited to the following steps.

S601: A scheduling module receives migration information sent by a migration module, and updates a first set or a second set.

Further, the migration information includes hot data migrated from a primary cluster to a secondary cluster and a key corresponding to the hot data, or the migration information includes non-hot data migrated from the secondary cluster to the primary cluster and a key corresponding to the non-hot data. The first set stores hot data that is migrated from the primary cluster to the secondary cluster and on which data consistency verification is not performed and a key corresponding to the hot data. The second set stores non-hot data that is migrated from the secondary cluster to the primary cluster and on which data consistency verification is not performed and a key corresponding to the non-hot data.

Further, for a specific implementation process, refer to related descriptions in S503. For brevity, details are not described herein again.

S602: The scheduling module determines whether a key set includes a key in a current service request, and if the key set includes the key in the current service request, performs step S603, or if the key set does not include the key in the current service request, performs step S604.

Further, the scheduling module maintains a key set. The key set includes keys corresponding to all hot data that has been migrated from the primary cluster to the secondary cluster, that is, the key set includes keys corresponding to all data that is currently stored and managed by the secondary cluster and on which data consistency verification is performed.

S603: The scheduling module determines whether the second set includes the key in the current service request, and if the second set includes the key in the current service request, performs step S605, or if the second set does not include the key in the current service request, performs step S606.

Further, the scheduling module may determine whether the second set includes the key in the current service request, to determine whether data corresponding to the key is the non-hot data migrated from the secondary cluster to the primary cluster. If the second set includes the key in the current service request, it indicates that the data corresponding to the key is the non-hot data migrated from the secondary cluster to the primary cluster, otherwise, it indicates that the data corresponding to the key is not the non-hot data migrated from the secondary cluster to the primary cluster. For a specific determining process, refer to related descriptions in S505.

S604: The scheduling module determines whether the first set includes the key in the current service request, and if the first set includes the key in the current service request, performs step S607, or if the first set does not include the key in the current service request, performs step S608.

S605: The scheduling module determines whether the data that corresponds to the key and that is in the second set is consistent with the data that corresponds to the key and that is managed by the secondary cluster at a current moment, and if the data is consistent, performs step S609, or if the data is inconsistent, performs step S610.

Further, the scheduling module determines whether the data that corresponds to the key and that is in the second set is consistent with the data that corresponds to the key and that is managed by the secondary cluster at the current moment, to determine whether the non-hot data changes in a migration process. If the data is consistent, it indicates that the data corresponding to the key does not change in the migration process from the secondary cluster to the primary cluster, and the data has been successfully migrated to the primary cluster. Otherwise, it indicates that the data changes in the migration process from the secondary cluster to the primary cluster, and the migration fails. For a specific determining process, refer to related descriptions in S504 and S505.

S606: The scheduling module accesses the secondary cluster.

S607: The scheduling module determines whether the data that corresponds to the key and that is in the first set is consistent with the data that corresponds to the key and that is managed by the primary cluster at a current moment, and if the data is consistent, performs step S611, or if the data is inconsistent, performs step S612.

Further, the scheduling module determines whether the data that corresponds to the key and that is in the first set is consistent with the data that corresponds to the key and that is managed by the primary cluster at the current moment, to determine whether the data changes in a migration process. If the data is consistent, it indicates that the data corresponding to the key does not change in the migration process from the primary cluster to the secondary cluster, and the data has been successfully migrated to the secondary cluster. Otherwise, it indicates that the data changes in the migration process from the primary cluster to the secondary cluster, and the migration fails. For a specific determining process, refer to related descriptions in S504 and S505.

The scheduling module accesses the primary cluster.

S609: The scheduling module deletes the key from the key set, and deletes the key and the data corresponding to the key from the second set.

S610: The scheduling module deletes the key and the data corresponding to the key from the second set.

S611: The scheduling module adds the key to the key set, and deletes the key and the data corresponding to the key from the first set.

S612: The scheduling module deletes the key and the data corresponding to the key from the first set.

It should be noted that for specific details in the method embodiment shown in FIG. 6A and FIG. 6B, reference may be made to related descriptions in steps S301 to S303 in the method embodiment shown in FIG. 3 and steps S501 to S505 in the method embodiment shown in FIG. 5. For brevity, details are not described herein again.

The methods in the embodiments of this application are described in detail above. For ease of better implementing the solutions in the embodiments of this application, correspondingly related devices used to cooperate in implementing the solutions are further provided below.

Figure 7A:
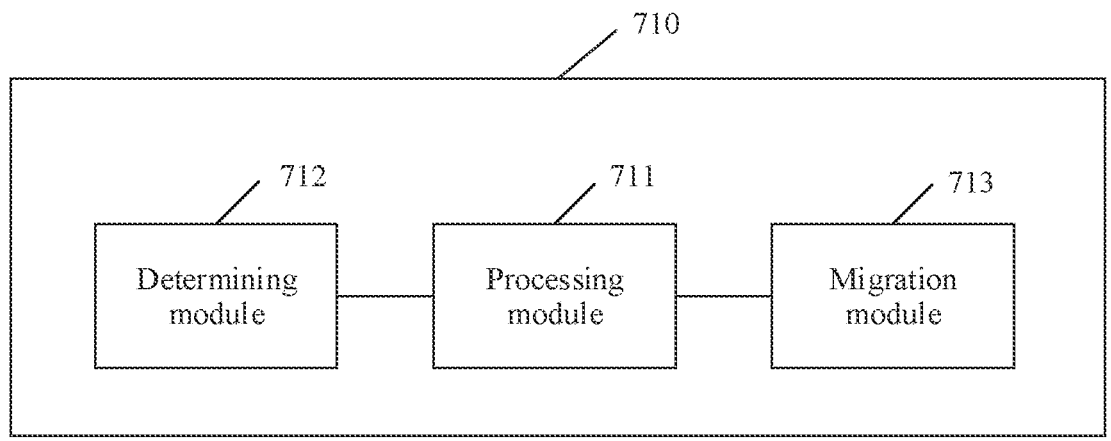
FIG. 7A is a schematic diagram of a structure of a network device according to an embodiment of this application.

FIG. 7A is a schematic diagram of a structure of a network device according to an embodiment of this application. The network device may be the database server in the method embodiment shown in FIG. 3, and may perform the method and steps performed by the database server in the hot data management method embodiment shown in FIG. 3. As shown in FIG. 7A, the network device 710 includes a processing module 711, a determining module 712, and a migration module 713.

The processing module 711 is configured to determine hot data managed by a first cluster. The first cluster includes at least one single-threaded main control unit, the single-threaded main control unit processes one access request at a time, and the access request includes an access request for data.

The determining module 712 is configured to determine whether a migration condition for migrating the hot data to a second cluster is met. The second cluster includes at least one single-threaded main control unit, the data accessed by the access request is jointly managed by the first cluster and the second cluster, and the second cluster is used to manage hot data that meets the migration condition.

The migration module 713 is configured to, when the migration condition is met, migrate the hot data to the second cluster, and trigger update of an access path of the hot data.

Figure 7B:
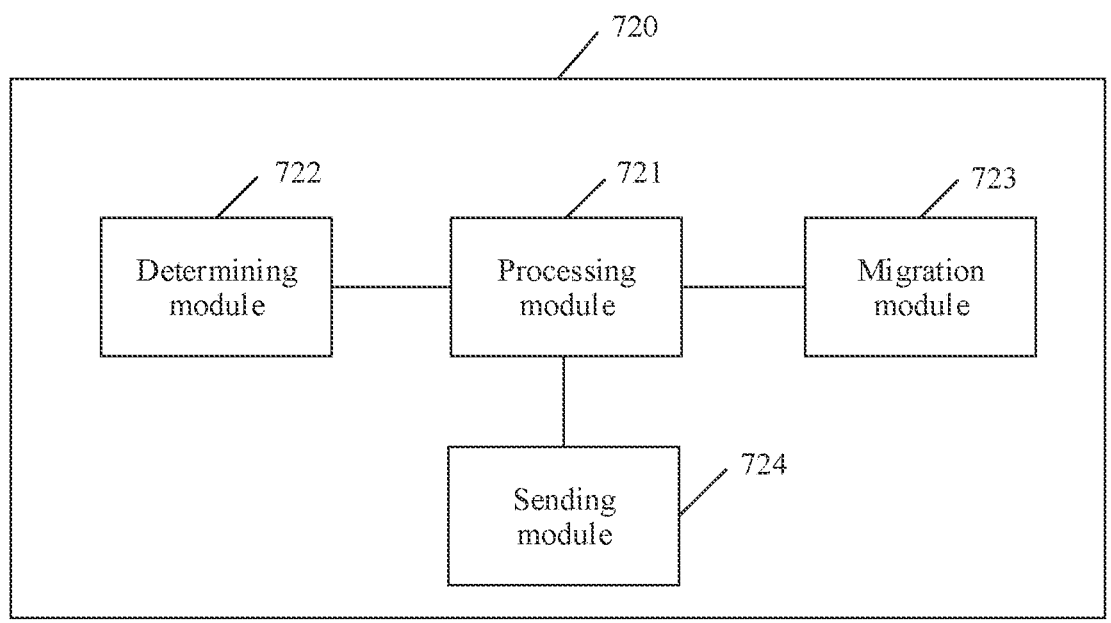
FIG. 7B is a schematic diagram of a structure of another network device according to an embodiment of this application.

FIG. 7B is a schematic diagram of a structure of another network device according to an embodiment of this application. As shown in FIG. 7B, the network device 720 includes a processing module 721, a determining module 722, a migration module 723, and a sending module 724.

In an embodiment, a first main control unit in a first cluster and a first main control unit in a second cluster are deployed on different physical devices.

In an embodiment, the main control unit manages at least one hash slot, An identifier of the hash slot is an integer obtained by mapping data by using a preset algorithm, and the hash slot includes at least one piece of data. A hash slot managed by the first main control unit in the first cluster and a hash slot managed by the first main control unit in the second cluster have a same identifier.

In an embodiment, the processing module 721 is configured to read hot data and a key corresponding to the hot data from the first cluster, and determine a first hash slot in the second cluster based on the key corresponding to the hot data. The migration module 723 is further configured to migrate the hot data and the key corresponding to the hot data to the first hash slot.

In an embodiment, the sending module 724 is configured to send migration information to a client communicating with the first cluster and the second cluster. The migration information includes the key corresponding to the hot data, the migration information is used to indicate the client to record the key corresponding to the hot data in a key set, the key set is used by the client to determine a target cluster corresponding to an access request, and the target cluster includes the first cluster and the second cluster.

In an embodiment, the processing module 721 is further configured to read hot data managed by the first cluster after the migration, and verify whether the hot data is consistent with the hot data managed by the first cluster before the migration. The sending module 724 is further configured to when the hot data managed by the first cluster after the migration is consistent with the hot data managed by the first cluster before the migration, send the migration information to the client communicating with the first cluster and the second cluster.

In an embodiment, the sending module 724 is configured to send the migration information to the client communicating with the first cluster and the second cluster. The migration information carries the hot data and the key corresponding to the hot data, the migration information is used to indicate the client to record the hot data and the key corresponding to the hot data in a first set, and the first set is used by the client to determine data consistency.

In an embodiment, the processing module 721 is further configured to calculate resource usage of each main control unit in the first cluster, monitor a main control unit whose resource usage exceeds a first threshold, count a quantity of access times of each piece of data managed by the main control unit whose resource usage exceeds the first threshold within a preset period, and determine data whose quantity of access times exceeds a second threshold as the hot data.

In an embodiment, the determining module 722 is further configured to count a total quantity of access times of data managed by the main control unit whose resource usage exceeds the first threshold, and when the total quantity of access times exceeds a third threshold, determine that hot data managed by the main control unit whose resource usage exceeds the first threshold meets a migration condition.

In an embodiment, the processing module 721 is further configured to monitor the second cluster, where the second cluster manages the hot data migrated from the first cluster to the second cluster, count a quantity of access times of the hot data within a preset period, and when the quantity of access times of the hot data is less than a fourth threshold, mark the hot data as non-hot data. The migration module 723 is further configured to migrate the non-hot data to the first cluster, and trigger update of an access path of the non-hot data.

It should be noted that the structure of the network device and the process of implementing hot data migration by using the network device are merely examples, and should not constitute a specific limitation. Units in the network device may be added, reduced, or combined based on a requirement. In addition, operations and/or functions of modules in the network device are intended to implement corresponding procedures of the method described in FIG. 3. For brevity, details are not described herein again.

Figure 8A:
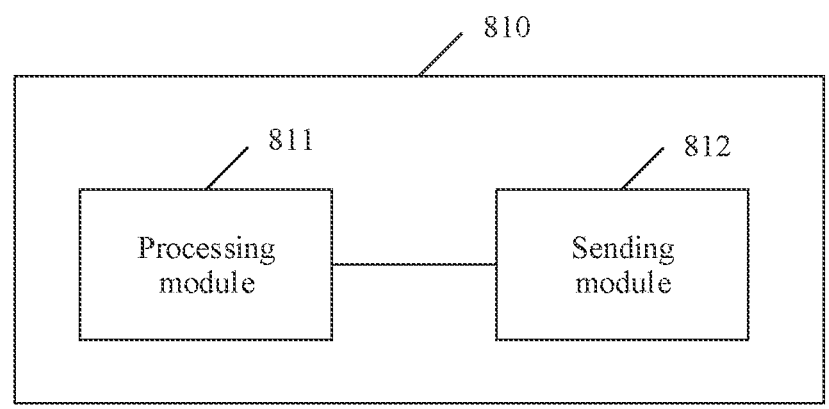
FIG. 8A is a schematic diagram of a structure of a client device according to an embodiment of this application.

FIG. 8A is a schematic diagram of a structure of a client device according to an embodiment of this application. The client device may be the device in the method embodiments described in FIG. 5, FIG. 6A, and FIG. 6B, and may perform the method and steps performed by the client in the hot data management method embodiments described in FIG. 5, FIG. 6A, and FIG. 6B. As shown in FIG. 8A, the client device 810 includes a processing module 811 and a sending module 812.

The processing module 811 is configured to query, based on a key in a service request, whether a key set includes the key, where the key set includes a key corresponding to hot data migrated from a first cluster to a second cluster, the first cluster and the second cluster include at least one single-threaded main control unit, the single-threaded main control unit processes one access request at a time, the access request includes an access request for data, and the data accessed by the access request is jointly managed by the first cluster and the second cluster, and determine a target cluster based on a query result, where the target cluster includes the first cluster or the second cluster.

The sending module 812 is configured to send an access request to the target cluster. The access request includes the key in the service request.

Figure 8B:
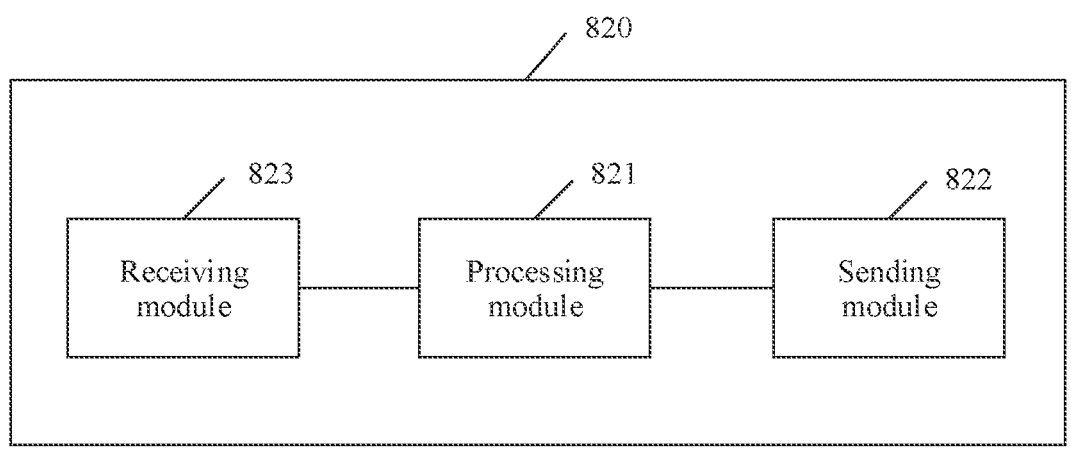
FIG. 8B is a schematic diagram of a structure of another client device according to an embodiment of this application.

FIG. 8B is a schematic diagram of a structure of another client device according to an embodiment of this application. As shown in FIG. 8B, the client device 820 includes a processing module 821, a sending module 822, and a receiving module 823.

In an embodiment, the receiving module 823 is configured to receive migration information sent by a database server. The migration information includes a key corresponding to hot data. The processing module 821 is further configured to record the key corresponding to the hot data in a key set.

In an embodiment, the receiving module 823 is configured to receive first migration information sent by the database server. The first migration information includes the hot data and the key corresponding to the hot data. The processing module 821 is further configured to record the hot data and the key corresponding to the hot data in a first set. The receiving module 823 is further configured to receive second migration information sent by the database server. The second migration information includes non-hot data and a key corresponding to the non-hot data. The processing module 821 is further configured to record the non-hot data and the key corresponding to the non-hot data in a second set. The first set and the second set are used to buffer data on which data consistency determining is not performed.

In an embodiment, the processing module 821 is further configured to when the key set includes a key in a service request, determine that a second cluster is a target cluster. The processing module 821 is further configured to, when the key set does not include the key in the service request, determine that a first cluster is the target cluster.

It should be noted that the structure of the client device and the process of implementing hot data migration by using the client device are merely examples, and should not constitute a specific limitation. Units in the client device may be added, reduced, or combined based on a requirement. In addition, operations and/or functions of modules in the client device are intended to implement corresponding procedures of the method described in FIG. 5, FIG. 6A, and FIG. 6B. For brevity, details are not described herein again.

Figure 9:
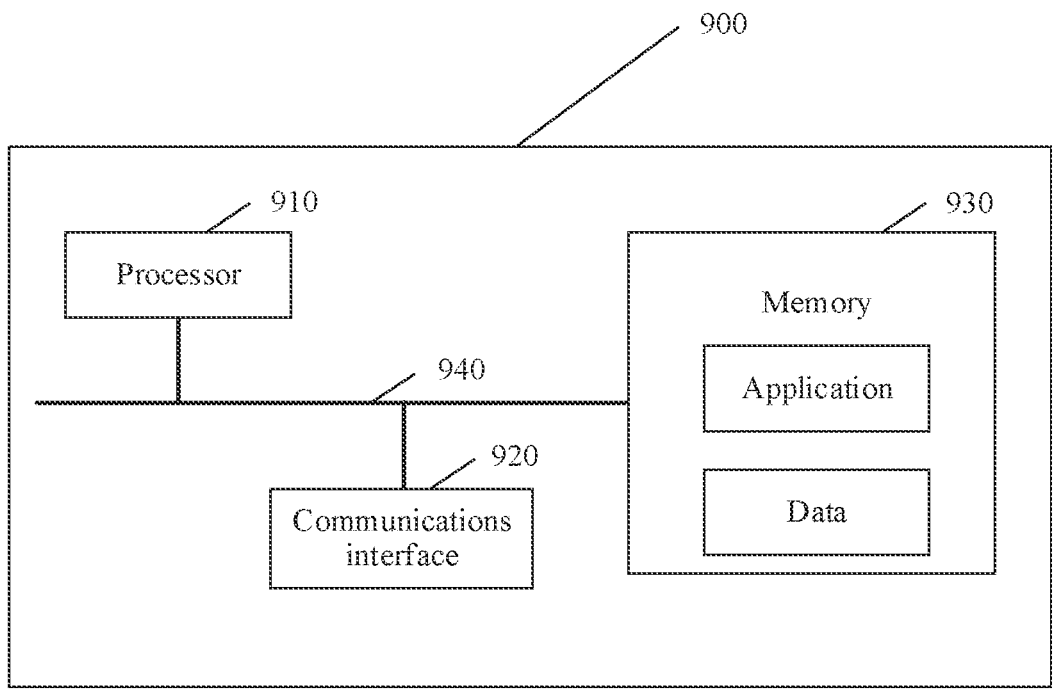
FIG. 9 is a schematic diagram of a structure of a network device according to an embodiment of this application.

FIG. 9 is a schematic diagram of a structure of a network device according to an embodiment of this application. As shown in FIG. 9, the network device 900 includes a processor 910, a communications interface 920, and a memory 930. The processor 910, the communications interface 920, and the memory 930 are connected to each other through an internal bus 940. It should be understood that the network device may be a database server.

The processor 910 may include one or more general-purpose processors, such as a CPU or a combination of a CPU and a hardware chip. The hardware chip may be an application-specific integrated circuit (ASIC), a programmable logic device (PLD), or a combination thereof. The PLD may be a complex PLD (CPLD), a field-programmable gate array (FPGA), generic array logic (GAL), or any combination thereof.

The bus 940 may be a Peripheral Component Interconnect (PCI) bus, an Extended Industry Standard Architecture (EISA) bus, or the like. The bus 940 may be classified into an address bus, a data bus, a control bus, and the like. For ease of representation, only one thick line is used to represent the bus in FIG. 9, but this does not mean that there is only one bus or only one type of bus.

The memory 930 may include a volatile memory such as a random-access memory (RAM), or the memory 930 may include a non-volatile memory such as a read-only memory (ROM), a flash memory, a hard disk drive (HDD), or a solid-state drive (SSD), or the memory 930 may include a combination of the foregoing types. The memory 930 may be configured to store a program and data, so that the processor 910 invokes the program code and data stored in the memory 930, to implement functions of the processing modules 711 and 721. The program code may be used to implement the function modules shown in FIG. 7A and FIG. 7B, or used to implement method steps performed by the database server in the method embodiment shown in FIG. 3.

Figure 10:
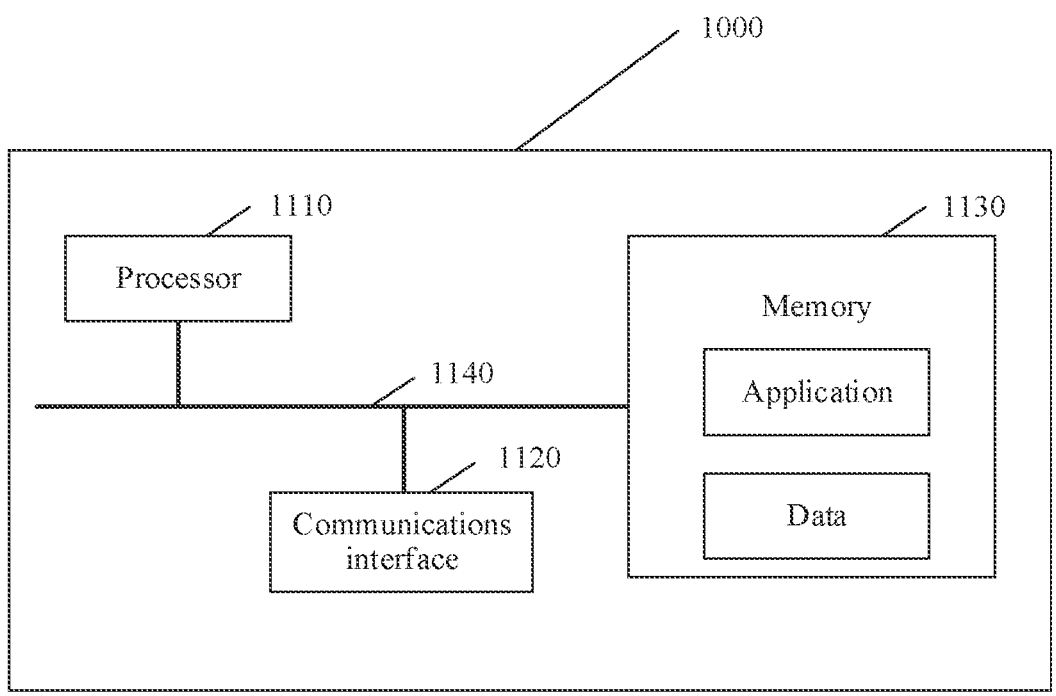
FIG. 10 is a schematic diagram of a structure of a client device according to an embodiment of this application.

FIG. 10 is a schematic diagram of a structure of a client device according to an embodiment of this application. As shown in FIG. 10, the client device 1000 includes a processor 1110, a communications interface 1120, and a memory 1130. The processor 1110, the communications interface 1120, and the memory 1130 are connected to each other through an internal bus 1140. It should be understood that the client device may be a computer or a server.

The processor 1110 may include one or more general-purpose processors, such as a CPU or a combination of a CPU and a hardware chip. The hardware chip may be an ASIC, a PLD, or a combination thereof. The PLD may be a CPLD, an FPGA, GAL, or any combination thereof.

The bus 1140 may be a PCI bus, an EISA bus, or the like. The bus 1140 may be classified into an address bus, a data bus, a control bus, and the like. For ease of representation, only one thick line is used to represent the bus in FIG. 10, but this does not mean that there is only one bus or only one type of bus.

The memory 1130 may include a volatile memory such as a RAM, or the memory 1130 may include a non-volatile memory such as a ROM, a flash memory, an HDD, or an SSD, or the memory 1130 may include a combination of the foregoing types. The memory 1130 may be configured to store a program and data, so that the processor 1110 invokes the program code and data stored in the memory 1130, to implement functions of the processing modules 811 and 821. The program code may be used to implement the function modules shown in FIG. 8A and FIG. 8B, or used to implement method steps performed by the client device in the method embodiments shown in FIG. 5, FIG. 6A, and FIG. 6B.

An embodiment of this application further provides a computer-readable storage medium. The computer-readable storage medium stores a computer program. When the program is executed by a processor, a part or all of the steps recorded in any one of the foregoing method embodiments can be implemented, and functions of any function module described in FIG. 7A and FIG. 7B can be implemented.

An embodiment of this application further provides a computer-readable storage medium. The computer-readable storage medium stores a computer program. When the program is executed by a processor, a part or all of the steps recorded in any one of the foregoing method embodiments can be implemented, and functions of any function module described in FIG. 8A and FIG. 8B can be implemented.

An embodiment of this application further provides a computer program product. When the computer program product runs on a computer or a processor, the computer or the processor is enabled to perform one or more steps in any one of the foregoing methods. When the foregoing modules in the device are implemented in a form of a software function unit and sold or used as an independent product, the modules may be stored in a computer-readable storage medium.

In the foregoing embodiments, the descriptions in the embodiments have respective focuses: For a part that is not described in detail in an embodiment, refer to related descriptions in other embodiments.

It should further be understood that "first", "second", "third", "fourth", and various numbers in this specification are merely used for differentiation for ease of description, and are not construed as any limitation on the scope of this application.

It should be understood that the term "and/or" in this specification describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

It should further be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that units, algorithms, and steps in the examples described with reference to the embodiments disclosed in this application can be implemented by electronic hardware or a combination of computer software and electronic hardware. Whether these functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, and may be located in one location, or may be distributed on a plurality of network units. Some or all of the units may be selected based on an actual requirement to achieve the objectives of the solutions in the embodiments.

In addition, function units in the embodiments of this application may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a Universal Serial Bus (USB) flash drive, a removable hard disk, a ROM, a RAM, a magnetic disk, or an optical disc.

A sequence of the steps of the method in the embodiments of this application may be adjusted, combined, or deleted based on an actual requirement.

The modules in the apparatus in the embodiments of this application may be combined, divided, and deleted based on an actual requirement.

In conclusion, the foregoing embodiments are merely intended for describing the technical solutions of this application, but not for limiting this application. Although this application is described in detail with reference to the foregoing embodiments, a person of ordinary skill in the art should understand that modifications to the technical solutions described in the foregoing embodiments or equivalent replacements to some technical features thereof may still be made, without departing from the scope of the technical solutions of the embodiments of this application.

What is claimed is:

1. A method comprising:
   obtaining hot data managed by a first cluster, wherein the first cluster comprises at least one first single-threaded main controller;
   processing, at the at least one single-threaded main controller, an access request at a time, wherein the access request requests data;
   obtaining a migration condition that indicates the hot data is to be migrated to a second cluster, wherein the second cluster comprises at least one second single-threaded main controller, and wherein the second cluster manages second hot data that is migrated according to the migration condition;
   reading a key corresponding to the hot data from the first cluster;
   obtaining a first hash slot in the second cluster based on the key;
   migrating, in response to the migration condition being met, the hot data and the key to the first hash slot in the second cluster; and
   triggering, in response to the migration condition being met, a first update of a first access path of the hot data.

2. The method of claim 1, wherein the at least one first single-threaded main controller in the first cluster and the at least one second single-threaded main controller in the second cluster are deployed on different physical devices.

3. The method of claim 1, further comprising:
   managing, by the at least one first single-threaded main controller, at least one first hash slot, wherein a first identifier of the at least one first hash slot is a first integer obtained by mapping first data based on a first preset algorithm, and wherein the at least one first hash slot comprises at least one piece of the first data; and
   managing, by the at least one second single-threaded main controller, at least one second hash slot, wherein a second identifier of the at least one second hash slot is a second integer obtained by mapping second data based on a second preset algorithm, and wherein the at least one second hash slot comprises at least one piece of the second data, wherein the first identifier and the second identifier are the same.

4. The method of claim 1, further comprising sending, to a client communicating with the first cluster and the second cluster, migration information carrying the key corresponding to the hot data, wherein the migration information instructs the client to record the key in a key set to enable the client to determine a target cluster corresponding to the access request, and wherein the target cluster comprises the first cluster or the second cluster.

5. The method of claim 4, wherein before sending the migration information, the method further comprises:
   reading third hot data managed by the first cluster after migrating the hot data; and
   verifying whether the hot data is consistent with the third hot data.

6. The method of claim 1, further comprising:
   calculating resource usage of each of single-threaded main controllers in the first cluster;
   monitoring, in response to calculating, a third single-threaded main controller that has a resource usage exceeding a first threshold;
   counting a quantity of access times of each piece of second data managed by the third single-threaded main controller within a preset period; and
   determining third data with a quantity of access times exceeding a second threshold as the hot data.

7. The method of claim 6, further comprising:
   counting a total quantity of access times of the second data; and
   determining, in response to the total quantity of access times exceeds a third threshold, that third hot data managed by the third single-threaded main controller meets the migration condition.

8. The method of claim 1, further comprising:
   monitoring the second cluster that manages the hot data migrated from the first cluster to the second cluster;
   counting a quantity of access times of the hot data within a preset period;
   marking, in response to the quantity of access times of the hot data is less than a fourth threshold, the hot data as non-hot data;
   migrating the non-hot data to the first cluster; and
   triggering a second update of a second access path of the non-hot data.

9. A network device comprising:
   one or more processors; and a memory coupled to the one or more processors and configured to store instructions, wherein when executed by the one or more processors, the instructions cause the network device to:
  obtain hot data managed by a first cluster, wherein the first cluster comprises at least one first single-threaded main controller, wherein the at least one first single-threaded main controller processes an access request at a time, and wherein the access request requests data;
  obtain a migration condition that indicates the hot data is to be migrated to a second cluster, wherein the second cluster comprises at least one second single-threaded main controller, and wherein the second cluster is configured to manage second hot data that is migrated according to the migration condition;
  read a key corresponding to the hot data from the first cluster;
  obtain a first hash slot in the second cluster based on the key;
  migrate, in response to the migration condition being met, the hot data and the key to the first hash slot in the second cluster; and
  trigger, in response to the migration condition being met, an update of an access path of the hot data.

10. The network device of claim 9, wherein when executed by the one or more processors, the instructions further cause the network device to:
  manage, by the at least one first single-threaded main controller, at least one first hash slot, wherein a first identifier of the at least one first hash slot is a first integer obtained by mapping first data based on a first preset algorithm, and wherein the at least one first hash slot comprises at least one piece of the first data; and
  manage, by the at least one second single-threaded main controller, at least one second hash slot, wherein a second identifier of the at least one second hash slot is a second integer obtained by mapping second data based on a second preset algorithm, and wherein the at least one second hash slot comprises at least one piece of the second data, wherein the first identifier and the second identifier are the same.

11. The network device of claim 9, wherein when executed by the one or more processors, the instructions further cause the network device to:
  calculate resource usage of each of single-threaded main controllers in the first cluster;
  monitor, in response to calculating, a third single-threaded main controller that has a resource usage exceeding a first threshold;
  count a quantity of access times of each piece of second data managed by the third single-threaded main controller within a preset period; and
  determine third data with a quantity of access times exceeding a second threshold as the hot data.

12. The network device of claim 11, wherein when executed by the one or more processors, the instructions further cause the network device to:
  count a total quantity of access times of the second data; and
  determine, in response to the total quantity of access times exceeds a third threshold, that third hot data managed by the third single-threaded main controller meets the migration condition.

13. The network device of claim 9, wherein when executed by the one or more processors, the instructions further cause the network device to:
  monitor the second cluster that manages the hot data migrated from the first cluster to the second cluster;
  count a quantity of access times of the hot data within a preset period;
  mark, in response to the quantity of access times of the second hot data is less than a fourth threshold, the hot data as non-hot data;
  migrate the non-hot data to the first cluster; and
  trigger a second update of a second access path of the non-hot data.

14. The network device of claim 9, wherein when executed by the one or more processors, the instructions further cause the network device to send, to a client communicating with the first cluster and the second cluster, migration information carrying the key corresponding to the hot data, wherein the migration information instructs the client to record the key in a key set to enable the client to determine a target cluster corresponding to the access request, and wherein the target cluster comprises the first cluster or the second cluster.

15. The network device of claim 14, wherein before sending the migration information, the instructions when executed by the one or more processors further cause the network device to:
  read third hot data managed by the first cluster after migrating the hot data; and
  verify whether the hot data is consistent with the third hot data.

16. A computer-program product comprising computer-executable instructions that are stored on a non-transitory computer-readable medium and that, when executed by one or more processors of a network device, cause the network device to:
  obtain hot data managed by a first cluster, wherein the first cluster comprises at least one first single-threaded main controller, wherein the at least one first single-threaded main controller processes an access request at a time, and wherein the access request requests data;
  obtain a migration condition that indicates the hot data is to be migrated to a second cluster, wherein the second cluster comprises at least one second single-threaded main controller, and wherein the second cluster is configured to manage second hot data that is migrated according to the migration condition;
  read a key corresponding to the hot data from the first cluster;
  obtain a first hash slot in the second cluster based on the key;
  migrate, in response to the migration condition being met, the hot data and the key to the first hash slot in the second cluster; and
  trigger, in response to the migration condition being met, an update of an access path of the hot data.

17. The computer-program product of claim 16, wherein the at least one first single-threaded main controller in the first cluster and the at least one second single-threaded main controller in the second cluster are deployed on different physical devices.

18. The computer-program product of claim 17, wherein the computer-executable instructions that are stored on the non-transitory computer-readable medium and that, when executed by the one or more processors of the network device, cause the network device to:
  read third hot data managed by the first cluster after migrating the hot data; and
  verify whether the hot data is consistent with the third hot data.

19. The computer-program product of claim 16, wherein the computer-executable instructions that are stored on the non-transitory computer-readable medium and that, when executed by the one or more processors of the network device, cause the network device to:
- calculate resource usage of each of single-threaded main controllers in the first cluster;
- monitor, in response to calculating, a third single-threaded main controller that has a resource usage exceeding a first threshold;
- count a quantity of access times of each piece of second data managed by the third single-threaded main controller within a preset period; and
- determine third data with a quantity of access times exceeding a second threshold as the hot data.

20. The computer-program product of claim 19, wherein the computer-executable instructions that are stored on the non-transitory computer-readable medium and that, when executed by the one or more processors of the network device, cause the network device to:
- counting a total quantity of access times of the second data; and
- determining, in response to the total quantity of access times exceeds a third threshold, that third hot data managed by the third single-threaded main controller meets the migration condition.

* * * * *